US010858455B2

United States Patent
Paul et al.

(10) Patent No.: US 10,858,455 B2
(45) Date of Patent: *Dec. 8, 2020

(54) PROCESS FOR THE PRODUCTION OF WATER AND SOLVENT-FREE NITRILE RUBBERS

(71) Applicant: ARLANXEO Deutschland Gmbh, Dormagen (DE)

(72) Inventors: Hanns-Ingolf Paul, Leverkusen (DE); Paul Wagner, Dusseldorf (DE); Rolf Feller, Mettmann (DE); Jorg Kirchhoff, Cologne (DE); John Lovegrove, Sarnia (CA); Florian Forner, Cologne (DE); Michael Klimpel, Langenfeld (DE); Peter Weuta, Leverkusen (DE); Sven Brandau, Strasbourg (FR)

(73) Assignee: ARLANXEO Deutschland GmbH, Dormagen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/254,407

(22) Filed: Sep. 1, 2016

(65) Prior Publication Data

US 2016/0369014 A1    Dec. 22, 2016

Related U.S. Application Data

(63) Continuation of application No. 13/635,810, filed as application No. PCT/EP2011/054257 on Mar. 21, 2011, now Pat. No. 9,469,697.

(30) Foreign Application Priority Data

Mar. 25, 2010 (EP) .................................. 10157844

(51) Int. Cl.
  *C08C 2/02* (2006.01)
  *C08C 1/12* (2006.01)
  (Continued)

(52) U.S. Cl.
  CPC .................. *C08C 2/02* (2013.01); *C08C 1/12* (2013.01); *C08C 2/00* (2013.01); *C08F 2/38* (2013.01);
  (Continued)

(58) Field of Classification Search
  CPC . C08F 236/12; C08F 2/38; C08C 1/12; C08C 2/02; B29B 13/06
  See application file for complete search history.

(56) References Cited

U.S. PATENT DOCUMENTS 3,226,371 A * 12/1965 Garvey, Jr. ............ C08F 236/04
                                                    526/224
3,687,915 A *  8/1972 Nistri ...................... B29B 13/06
                                                    528/503
(Continued)

FOREIGN PATENT DOCUMENTS

WO     WO-0160792 A1 *  8/2001  ............ C08F 220/18

OTHER PUBLICATIONS

Arlanxeo (Krynac X 740. Lanxess. 2010. 2 pages).*
(Continued)

*Primary Examiner* — Brieann R Johnston
(74) *Attorney, Agent, or Firm* — Norris McLaughlin, P.A.

(57) ABSTRACT

The present invention relates to specific water and solvent-free nitrile rubbers having specific functional groups and/or end groups, a process for the production thereof and the use thereof.

9 Claims, 3 Drawing Sheets

(51) Int. Cl.
*C08C 2/00* (2006.01)
*C08L 9/02* (2006.01)
*C08F 2/38* (2006.01)
*C08F 236/12* (2006.01)
*C08F 236/04* (2006.01)

(52) U.S. Cl.
CPC .......... *C08F 236/04* (2013.01); *C08F 236/12* (2013.01); *C08L 9/02* (2013.01)

(56) References Cited

U.S. PATENT DOCUMENTS

| | | | | |
|---|---|---|---|---|
| 5,627,250 | A * | 5/1997 | Tsuji | C08F 236/12 264/328.2 |
| 6,369,158 | B1 * | 4/2002 | Senyek | C08F 212/08 524/836 |
| 9,469,697 | B2 * | 10/2016 | Paul | C08C 1/12 |
| 2003/0171500 | A1 * | 9/2003 | Guo | C08C 19/02 525/329.1 |
| 2003/0191262 | A1 * | 10/2003 | McCormick | C07C 327/36 526/288 |

OTHER PUBLICATIONS

Lanxess (Krynac X 740. Lanxess. 2017, 1 page).*
ASTM (Standard Test Methods for Rubbers From Synthetic Sources—Volatile Matter, 2014, 3 pages).*
Basu (Evidence for an in Situ Developed Polymer Phase in Ionic Elastomers. Macromolecules. 2014, 47, pp. 3436-3450).*
Coote (Computational Quantum Chemistry: Insights Into Polymerization Reaction; Chapter 6—Theory and Applications of Thiyl Radicals in Polymer Chemistry, 2019, pp. 195-218).*
Mun (Synthesis of emulsion styrene butadiene rubber by reversible addition-fragmentation chain transfer polymerization and its properties. Journal of Applied Polymer Science. 2019, 7 pages).*
Lanxess Product Range Technical Rubber Products, Edition Oct. 2010.
FujiFilm Wako Chemicals USA Corporation, Laboratory Chemicals, RAFT polymerization ("Reversible Addition Fragmentation Technology"); (labchem-wako.fujifilm.com)Oct. 23, 2019.

* cited by examiner

PROCESS FOR THE PRODUCTION OF WATER AND SOLVENT-FREE NITRILE RUBBERS

The present patent application is a continuation of pending U.S. patent application Ser. No. 13/635,810 filed May 2, 2013, entitled "PROCESS FOR THE PRODUCTION OF WATER AND SOLVENT-FREE NITRILE RUBBERS", which claims the right of priority under 35 U.S.C. § 119 (a)-(d) and 35 U.S.C. § 365 of International Application No. PCT/EP2011/054257, filed Mar. 21, 2011, and is entitled to the right of priority of European Patent Application No. 10157844.1, filed on Mar. 25, 2010.

The present invention relates to water and solvent-free nitrile rubbers, a process for the production thereof and the use thereof.

Nitrile rubbers ("NBR") are prepared by copolymerising α,β-unsaturated nitriles with conjugated dienes and optionally one or more copolymerizable termonomers. The copolymerisation, is typically carried out in emulsion and results in a NBR latex. Said latex is then subjected to steam stripping to remove e.g. unreacted monomers and afterwards to coagulation in order to isolate the NBR solid using mostly salts or acids as coagulants. The NBR is obtained in the form of wet crumbs in water. Most of the water is then be separated by draining, followed e.g. by the application of dewatering extruders and a final vacuum drying step e.g. in a tunnel dryer or a fluidized bed. Such process is e.g. described in EP-A-1 369 436.

The aforementioned process for coagulation and steam stripping suffers from high energy consumption. A large amount of steam is necessary not only to evaporate the unreacted monomers but also to heat and maintain the complete water content of the stripping drums at a high temperature. The aforementioned process also utilizes a large amount of water because the concentration of nitrile rubber in the slurry after coagulation is generally only 5 to 20% by weight. All water from this slurry constitutes waste water and must be disposed of.

The rubber crumbs are separated from the bulk water mechanically using simple sieve trays or screens. The disadvantage of this mechanical drying process is the contamination of the waste water by small rubber particles that were not held back by the sieves with the result that the waste water requires additional treatment. After this first separation the nitrile rubber still contains approximately up to 50% water. Additional drying stages are therefore required which may be performed by means of dewatering extruders in which the rubber is heated to 150 to 200° C. under pressure, e.g. using a single screw or twin screw extruder. A die plate may be installed at the extruder outlet to maintain the pressure. When the rubber is pushed through the die plate, the water in the rubber evaporates and forms open porous crumbs. A cutting device then cuts the crumbs into small pieces. The aforementioned dewatering can only diminish the moisture content down to approximately 5 to 15%. Hence the crumbs must be conveyed to a convective dryer where residual moisture is removed by hot air. After such drying, the nitrile rubber generally has a moisture content of 0.1 to 1.0%. If desired, a cooling stage, accomplished by flowing cold air through the rubber crumbs, can be applied to cool the nitrile rubber crumbs down to the maximum baling temperature of 60° C. The crumbs are then formed into bales by hydraulic presses, and the bales are packed into boxes or crates for shipment.

The aforementioned process for drying nitrile rubbers is complex and requires extensive equipment. Furthermore, the process parameters must be carefully monitored to avoid heat and shear stress, which would have an impact on the property profile of the final product.

In a newly developed process, the nitrile rubber can be polymerized in an organic solvent as claimed in a patent application by the applicant hereof which is not yet published. The reaction mixture obtained after such polymerization contains not only the nitrile rubber but also unreacted monomers the majority of which may be removed in a distillation stripping process. After such distillation the nitrile rubber is present as a homogeneous solution in the solvent. In principle the isolation of the nitrile rubber could be also performed similarly to the procedure known for emulsion-polymerized nitrile rubber. This would involve contact with steam and/or hot water and/or coagulants. However, this would result in the nitrile rubber being present in the form of wet crumbs in a mixture of water and organic solvent which makes the whole process highly undesirable from an economical as well as ecological point of view.

Various special processes have been developed with the aim of removing water and volatile organic solvents from different types of polymers. Extruder degassing in vacuum with or without the use of entrainers has gained acceptance in practical applications as the most important technique, however, the energy requirements of such prior art processes are quite high. U.S. Pat. No. 3,117,953 A1 discloses an apparatus and process for purifying high pressure polyethylene. The substitution of synthetic rubber cement for polyethylene in U.S. Pat. No. 3,117,953 A1 would, however, result in crumbs being formed prior to entering the extruder, which is not desirable at all. DE 195 37 113 discloses a method and an apparatus for polymer resins in particular polycarbonate resins using a steam stripper a decanter and an extruder. However, the introduction of steam would result in an undesireable high content of residual water or a very high energy consumption. EP 0 102 122 discloses a method for polymer recovery from a solution, in particular for recovery of polyethylene, using a partially filled extruder. However, EP 0 102 122 is silent about the removal of residual water. US 2001/056176 A1 discloses a one step method of recovering a polymer and specifically an example for the concentration of rubber solutions. The rubber solution is thereby heated with steam in order to remove existing solvents in one step by degassing under vacuum to produce white crumb. US 2001/056176 A1 thereby requires a large volumetric vapor flow to remove the volatile components at low vapor pressure and results in the enclosure of additional water in the crumbs, which water would subsequently need to be removed. U.S. Pat. No. 5,283,021 A1 discloses a two step process for removing solvent from an elastomeric polymer solution. The polymer solution is thereby heated directly by a heating fluid and sprayed under vacuum. During the spraying, the solvent is evaporated, thereby forming crumbs which are then fed to an extruder for further degassing. However, crumb formation at that stage is not desirable. EP 1 127 609 A2 discloses a process to treat a product in at least one kneader. EP 1 127 609 A2 uses energy introduced in part through the wall of the kneader itself to evaporate the solvent from solutions containing elastomers and thermoplastics. A kneader with a large surface area is therefore required as are high investment costs. Another portion of the energy is introduced via the rotating shaft of the kneader as mechanical energy. Mechanical energy is more expensive and therefore environmentally disadvantageous when compared to steam heating. The kneaders used in EP 1 127 609 A2 require a great deal of maintenance and cleaning. The introduction of mechanical energy via the kneader is furthermore strongly dependent on the viscosity of the product, which reduces the flexibility of the process. EP 1 165 302 A1 discloses a device and method for degassing plastics this being an extruder with a rear vent and several vent sections operated under vacuum. The vacuum is needed to achieve low residual volatile concentrations. EP 1 165 302 A1 discloses that a stripping agent can be applied to further improve degassing efficiency. The plastic used in EP 1 165 302 A1, the thermoplastic polycarbonate, remains a flowing melt at the end of the degassing process. A synthetic rubber cement processed pursuant to EP 1 165 302 A1 would, however, convert to crumbs at the end of the degassing stage and could not be processed further. In "Process Machinery", Parts I and II, March and April 2000; Author: C. G. Hagberg, a direct volatilization of rubber solutions using a flash tank and an extruder is disclosed. However, this reference is silent about the contents of volatile compounds in the final product.

Therefore the object of the present invention was to provide an energy efficient, ecologically and economically favourable process to remove volatile compounds from a fluid containing at least a nitrile rubber. Preferably such process should be operable continuously. It was a further object of the invention to provide a nitrile rubber product that is substantially free of volatile compounds.

This object is solved by a process of removing volatile compounds from a fluid (F) containing (1) at least one nitrile rubber and (2) at least one volatile compound, wherein the process comprises at least the steps of a) treating the fluid (F) in at least one concentrator unit comprising at least a heater, a degassing vessel (4) and a vapor line, whereby the fluid (F) is heated, the heated fluid (G) is fed into a degassing vessel where part of the volatile compounds are removed via the vapor line to obtain a concentrated fluid (H), b) reheating the concentrated fluid (H) from step a) in at least one reheating unit to obtain a reheated concentrated fluid (L);

c) feeding the reheated concentrated fluid (L) from step b) into at least one extruder unit comprising at least an extruder degassing section comprising at least a conveying section, a vent port with one or more vapor lines, an accumulating section and an outlet section, whereby volatile compounds are removed through the vent ports and vapor lines, wherein the reheated concentrated fluid (L) is free-flowing upon entering the extruder degassing section and wherein the nitrile rubber obtained at the outlet section is substantially free of volatile compounds, and wherein the nitrile rubber (1) contained in Fluid (F) comprises (i) repeating units derived from at least one conjugated diene, at least one α,β-unsaturated nitrile and optionally one or more further copolymerizable monomers, and (i) one or more structural elements of the general formulae (I), (II), (III), (IV) or (V)

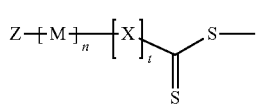

(I)

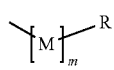

(II)

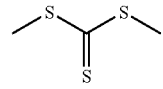

(III)

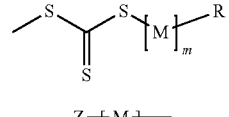

(IV)

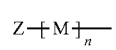

(V)

in which

Z is H, a linear or branched, saturated, mono- or polyunsaturated alkyl radical, a saturated, mono- or polyunsaturated carbocyclyl or heterocyclyl radical, aryl, heteroaryl, arylalkyl, heteroarylalkyl, alkoxy, aryloxy, heteroaryloxy, amino, amido, hydroxyimino, carbamoyl, alkoxycarbonyl, F, Cl, Br, I, hydroxyl, phosphonato, phosphinato, alkylthio, arylthio, sulphanyl, thiocarboxyl, sulphinyl, sulphono, sulphino, sulpheno, sulphonic acids, sulphamoyl, silyl, silyloxy, nitrile, carbonyl, carboxyl, oxycarbonyl, oxysulphonyl, oxo, thioxo, borates, selenates, epoxy, cyanates, thiocyanates, isocyanates, thioisocyanates and isocyanides, M stands for repeating units of one or more mono- or polyunsaturated monomers comprising conjugated or non-conjugated dienes, alkynes and vinyl compounds, or for a structural element which derives polymers comprising polyethers, more particularly polyalkylene glycol ethers and polyalkylene oxides, polysiloxanes, polyols, polycarbonates, polyurethanes, polyisocyanates, polysaccharides, polyesters and polyamides, n and m are alike or different and are each in the range from 0 to 10 000, t is 0 or 1, if n=0, and is 1, if n≠0, X is C(Z$_2$), N(Z), P(Z), P(=O)(Z), O, S, S(=O) or S(=O)$_2$, it being possible for Z in these radicals to possess the same definitions as set out above, and R (a), if m≠0, may possess the same definitions as the radical Z, and (b), if m=0, is H, a linear or branched, saturated, mono- or polyunsaturated alkyl radical, a saturated, mono- or polyunsaturated carbocyclyl or heterocyclyl radical, aryl, heteroaryl, arylalkyl, heteroarylalkyl, alkoxy, aryloxy, heteroaryloxy, amino, amido, carbamoyl, alkoxy, aryloxy, alkylthio, arylthio, sulphanyl, thiocarboxyl, sulphinyl, sulphono, sulphino, sulpheno, sulphonic acids, sulphamoyl, carbonyl, carboxyl, oxycarbonyl, oxysulphonyl, oxo, thioxo, epoxy, cyanates, thiocyanates, isocyanates, thioisocyanates or isocyanides.

The nitrile rubber contained in Fluid (F) is prepared by a free-radical polymerization of the respective monomers in organic solution and in the additional presence of regulator molecules which are also referred to as chain-transfer agents in the art. Such polymerization represents a RAFT polymerisation ("Reversible Addition Fragmentation Technology"). Due to its nature certain fragments or structural elements of the regulator molecules may be found in the polymer backbone of the nitrile rubber or as end groups.

Hence, the process of the present invention removes volatile compounds from a fluid (F) containing (1) at least one nitrile rubber and (2) at least one volatile compound, wherein the process comprises at least the steps of a) treating the fluid (F) in at least one concentrator unit comprising at least a heater, a degassing vessel (4) and a vapor line, whereby the fluid (F) is heated, the heated fluid (G) is fed into a degassing vessel where part of the volatile compounds are removed via the vapor line to obtain a concentrated fluid (H), b) reheating the concentrated fluid (H) from step a) in at least one reheating unit to obtain a reheated concentrated fluid (L);

c) feeding the reheated concentrated fluid (L) from step b) into at least one extruder unit comprising at least an extruder degassing section comprising at least a conveying section, a vent port with one or more vapor lines, an accumulating section and an outlet section, whereby volatile compounds are removed through the vent ports and vapor lines, wherein the reheated concentrated fluid (L) is free-flowing upon entering the extruder degassing section and wherein the nitrile rubber obtained at the outlet section is substantially free of volatile compounds, and wherein the nitrile rubber (1) contained in Fluid (F) is obtained by a free-radical polymerization of at least one conjugated diene, at least one α,β-unsaturated nitrile and optionally one or more further copolymerizable monomers in the presence of at least one organic solvent and at least one regulator of the general structural formula (VI),

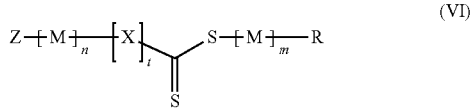

(VI)

in which

Z is H, a linear or branched, saturated, mono- or polyunsaturated alkyl radical, a saturated, mono- or polyunsaturated carbocyclyl or heterocyclyl radical, aryl, heteroaryl, arylalkyl, heteroarylalkyl, alkoxy, aryloxy, heteroaryloxy, amino, amido, hydroxyimino, carbamoyl, alkoxycarbonyl, F, Cl, Br, I, hydroxyl, phosphonato, phosphinato, alkylthio, arylthio, sulphanyl, thiocarboxyl, sulphinyl, sulphono, sulphino, sulpheno, sulphonic acids, sulphamoyl, silyl, silyloxy, nitrile, carbonyl, carboxyl, oxycarbonyl, oxysulphonyl, oxo, thioxo, borates, selenates, epoxy, cyanates, thiocyanates, isocyanates, thioisocyanates and isocyanides, R (a), if m≠0, may possess the same definitions as the radical Z, and (b), if m=0, is H, a linear or branched, saturated, mono- or polyunsaturated alkyl radical, a saturated, mono- or polyunsaturated carbocyclyl or heterocyclyl radical, aryl, heteroaryl, arylalkyl, heteroarylalkyl, alkoxy, aryloxy, heteroaryloxy, amino, amido, carbamoyl, alkoxy, aryloxy, alkylthio, arylthio, sulphanyl, thiocarboxyl, sulphinyl, sulphono, sulphino, sulpheno, sulphonic acids, sulphamoyl, carbonyl, carboxyl, oxycarbonyl, oxysulphonyl, oxo, thioxo, epoxy, cyanates, thiocyanates, isocyanates, thioisocyanates or isocyanides, M stands for repeating units of one or more mono- or polyunsaturated monomers comprising conjugated or non-conjugated dienes, alkynes and vinyl compounds, or for a structural element which derives polymers comprising polyethers, more particularly polyalkylene glycol ethers and polyalkylene oxides, polysiloxanes, polyols, polycarbonates, polyurethanes, polyisocyanates, polysaccharides, polyesters and polyamides, n and m are alike or different and are each in the range from 0 to 10 000, t is 0 or 1, if n=0, and is 1, if n≠0, and X is $C(Z_2)$, N(Z), P(Z), P(=O)(Z), O, S, S(=O) or $S(=O)_2$, it being possible for Z in these radicals to possess the same definitions as set out above for the formula (VI).

It is pointed out that the scope of the invention also encompasses any desired combinations of the ranges and areas of preference specified for each feature.

In the context of this invention the abbreviated term "nitrile rubber" shall always have the meaning set forth hereinabove, i.e. a nitrile rubber which is obtainable by a free-radical polymerization of the aforementioned monomers in organic solution and in the additional presence of a regulator according to formula (VI). As far as Product (P) is mentioned this shall mean the nitrile rubber after having been subjected to the process according to this invention.

In the context of this invention, the term "free-flowing" means a viscosity in the range from 50 to 50,000,000 mPa*s, preferably from 50 to 10,000,000 mPa*s, more preferably from 750 to 1,000,000 mPa*s and most preferably from 2,000 mPa*s to 500,000 mPa*s.

As far as not mentioned otherwise the viscosity values of fluids refer to the zero shear viscosity extrapolated from measurements at given temperature using a Haake Rheostress RS 150 viscometer or a rotational rheometer of cone-plate type for very viscous samples.

The extrapolation to zero shear viscosity is typically carried out as follows: Shear stress is measured at given temperature vs. shear rate. A $2^{nd}$ order polynomial is then fitted to the data points obtained by the measurement. The linear portion of such $2^{nd}$ order polynomial reflects the slope at a shear rate of zero and thus is the zero shear viscosity as used in the context of this invention.

In the context of this invention, the term "substantially free of volatile compounds" means a total concentration of volatile compounds of less than 1.25 wt %, preferably less than 0.75 wt. %, more preferably less than 0.5 wt %, more preferably less than 0.2 wt % based on the mass of the non-volatile nitrile rubber polymer.

In particular, the term "substantially free of volatile compounds" means substantially free of water and substantially free of volatile organic compounds.

Non-volatile nitrile rubbers are considered to be substantially free of water, if the residual water concentration is less than 0.5 wt % preferably less than 0.25 wt %, more preferably less than 0.1 wt % and most preferably less than 0.075 wt % based on the mass of the nitrile rubber polymer.

In the context of this invention, the term "volatile organic compounds" means organic compounds having a boiling point of below 250° C. at standard pressure.

Nitrile rubbers are considered substantially free of volatile organic compounds, if the residual concentration of said volatile organic compounds is less than 0.75 wt % preferably less than 0.5 wt %, more preferably less than 0.25 wt % and most preferably less than 0.1 wt % based on the mass of the nitrile rubber. Said volatile organic compounds encompass in particular the solvents employed in the polymerization and include e.g. dimethylacetamide, monochlorbenzene, toluene, ethylacetate and methylethylketon. Preferably the volatile organic compounds are polar solvents having a Hildebrand'schen solubility parameter $\delta$ ($\delta$=(($\Delta H_v$-RT)/$V_m$)$^{1/2}$ [(MPa)$^{1/2}$]) ($V_m$=molar volume; $\Delta H_v$=evaporation enthalpy; R=ideal gas constant)) in the range of from 15.5 and 26 (MPa)$^{1/2}$.

Detailed Description of Nitrile Rubbers (i):

The definitions stated in the aforementioned radicals Z and R in formula (VI) may in each case be singularly or multiply substituted. The following radicals preferably have single or multiple substitution: alkyl, carbocyclyl, heterocyclyl, aryl, heteroaryl, arylalkyl, heteroarylalkyl, alkoxy, aryloxy, alkylthio, arylthlio, amino, amido, carbamoyl, phosphonato, phosphinato, sulphanyl, thiocarboxyl, suphinyl, sulphono, sulphino, sulpheno, sulphamoyl, silyl, silyloxy, carbonyl, carboxyl, oxycarbonyl, oxysulphonyl, oxo, thioxo, borates, selenates and epoxy.

Suitable substituents include in turn—provided that chemically stable compounds are formed—all of the definitions which Z is able to adopt. Particularly suitable substituents are halogen, preferably fluoro, chloro, bromo or iodo, nitrile (CN) and carboxyl.

The definitions stated for Z and R in general formula (VI) also, explicitly, include salts of the stated radicals, where these are chemically possible and stable. These may be, for example, ammonium salts, alkali metal salts, alkaline earth metal salts, aluminium salts or protonated forms of the regulators of the general formula (VI).

The definitions given for Z and R in general formula (VI) also include organometallic radicals, examples being those which give the regulator a Grignard function. Z and R, furthermore, may represent or contain a carbanion, with lithium, zinc, tin, aluminium, lead and boron as counterion.

A further possibility is that the radical R is coupled, via a linker, to a solid phase or support substance. The linker may be a Wang, Sasrin, Rink acid, 2-chlorotrityl, Mannich, Safety Catch, Traceless or photolabile linker known to a person skilled in the art. Examples of suitable solid phases or support substances include silica, ion exchange resins, clays, montmorillonites, crosslinked polystyrene, polyethylene glycol grafted onto polystyrene, polyacrylamides ("Pepsyn"), polyethylene glycol-acrylamide copolymers (PEGA), cellulose, cotton, and granulated porous glass (CPG, controlled pore glass).

The definitions given for the radical "M" in general formula (VI) may be singly or multiply substituted. Consequently M may represent repeating units of one or more, mono- or polyunsaturated monomers, preferably optionally singly or multiply substituted, conjugated or non-conjugated dienes, optionally singly or multiply substituted alkynes, or optionally singly or multiply substituted vinyl compounds, examples being fluorinated mono- or polyunsaturated vinyl compounds, or else may represent a divalent structural element which derives from substituted or unsubstituted polymers comprising polyethers, more particularly polyalkylene glycol ethers and polyalkylene oxides, polysiloxanes, polyols, polycarbonates, polyurethanes, polyisocyanates, polysaccharides, polyesters and polyamides. Behind these radicals "M", therefore, there may lie a monomeric or polymeric radical.

Preference is given to nitrile rubbers comprising as general structural elements (ii)

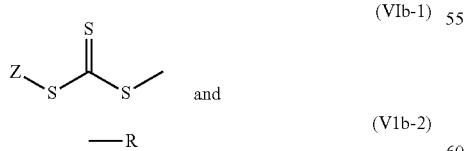

(VIb-1)

and

—R (VIb-2)

In which

Z possesses the definitions given above for the general formula (VI) and

R possesses the definitions given above for the general formula (VI), albeit with the restriction that R, following homolytic fission of the bond to the adjacent bonded atom in the nitrile rubber, forms alternatively a secondary, tertiary or aromatically stabilized radical.

It has proved to be in particular suitable for Z and R to be different in (VIb-1) and (VIb-2).

These structural elements represent possible end groups in the nitrile rubbers and are produced when the preferred regulators of the general formula (VIb) as hereinafter defined are used.

Particularly preferred nitrile rubbers are those comprising, as general structural elements (ii), the end group (VIb-1) and (VIb-2), in which R, with the proviso that R, following homolytic fission of the bond to the next bonded atom, forms alternatively a secondary, tertiary or aromatically stabilized radical, is a linear or branched, saturated or mono- or polyunsaturated, optionally singly or multiply substituted alkyl radical, preferably a corresponding $C_3$-$C_{20}$-alkyl radical, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or a saturated or mono- or polyunsaturated, optionally singly or multiply substituted carbocyclyl or heterocyclyl radical, more particularly cyclohexyl, cumyl or cyclohexane-1-nitrile-1-yl, a (hetero)aryl radical, very preferably a $C_6$-$C_{24}$-(hetero)aryl radical, more particularly phenyl, pyridinyl or anthracenyl, a (hetero)aralkyl radical, very preferably benzyl, phenylethyl or 1-methyl-1-phenyleth-2-yl, or a thiocarboxyl, carbonyl, carboxyl, oxo, thioxo, epoxy, and also salts of the aforementioned compounds.

Particular preference is given to nitrile rubbers in which general structural elements (ii) include

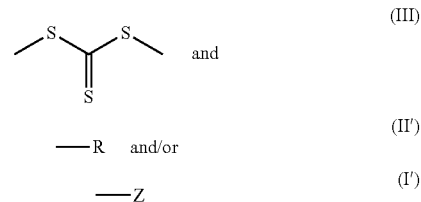

where

Z has the same meaning as in the general formula (I) and

R has the same meaning as in the general formula (II) for m=0, and

R and Z are alike or different, albeit in each case with the proviso that R and Z following homolytic fission of their bond to the respectively adjacent atom in the nitrile rubber each form a secondary, tertiary or aromatically stabilized radical.

Nitrile rubbers having the aforementioned general structural elements (ii) are obtained when a regulator of the general structural formula (VIb) as hereinafter defined is used, in which Z possesses the same definitions as for general formula (IV) and R possesses the same definitions as in general formula (IV) for variant b) with m=0, and R and Z are alike or different, albeit in each case with the proviso that R and Z, following homolytic fission of their bond to the closest sulphur in the regulator, each form a secondary, tertiary or aromatically stabilized radical.

Particular preference is given to nitrile rubbers comprising as general structural elements (ii) the elements (III) and (II') and/or (I') in which
R and Z are alike or different and, with the proviso that R and Z, following homolytic fission to the respectively adjacent bonded atom form respectively a secondary, tertiary or aromatically stabilized radical, is
a linear or branched, saturated or mono- or polyunsaturated, optionally singly or multiply substituted alkyl radical, preferably a corresponding $C_3$-$C_{20}$-alkyl radical, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or
a saturated or mono- or polyunsaturated, optionally singly or multiply substituted carbocyclyl or heterocyclyl radical, more particularly cyclohexyl, cumyl or cyclohexane-1-nitrile-1-yl,
a (hetero)aryl radical, very preferably a $C_6$-$C_{24}$-(hetero)aryl radical, more particularly phenyl, pyridinyl or anthracenyl,
a (hetero)aralkyl radical, very preferably benzyl, phenylethyl or 1-methyl-1-phenyleth-2-yl, or
a thiocarboxyll, carbonyl, carboxyl, oxo, thioxo, epoxy, and also salts of the aforementioned compounds.
Preference is given to nitrile rubbers comprising as general structural elements (ii)

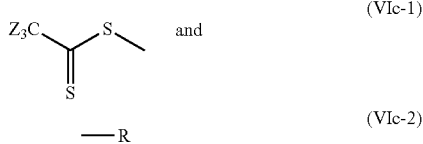

in which
Z possesses the definitions stated above for the general formula (I),
R possesses the definitions stated above for the general formula (II), albeit with the restriction that R, following homolytic fission of the bond to the adjacent atom in the unhydrogenated or hydrogenated nitrile rubber, forms a secondary, tertiary or aromatically stabilized radical.
These structural elements represent end groups in the nitrile rubbers and are formed when the preferred regulators of the general formula (VIc) as hereinafter defined are employed.
Furtheron particular preference is given to nitrile rubbers which comprise as general structural elements (ii) the structural elements (VIc-1) and (VIc-2) in which
R with the proviso that R, following homolytic fission of the bond to the next atom in the unhydrogenated or hydrogenated nitrile rubber, forms a secondary, tertiary or aromatically stabilized radical,
is a linear or branched, saturated or mono- or polyunsaturated, optionally singly or multiply substituted alkyl radical, preferably a corresponding $C_3$-$C_{20}$-alkyl radical, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or
a saturated or mono- or polyunsaturated, optionally singly or multiply substituted carbocyclyl or heterocyclyl radical, more particularly cyclohexyl, cumyl or cyclohexane-1-nitrile-1-yl, a (hetero)aryl radical, very preferably a $C_6$-$C_{24}$-(hetero)aryl radical, more particularly phenyl, pyridinyl or anthracenyl,
a (hetero)aralkyl radical, very preferably benzyl, phenylethyl or 1-methyl-1-phenyleth-2-yl, or
a thiocarboxyl, carbonyl, carboxyl, oxo, thioxo, epoxy, and also salts of the aforementioned compounds.

The conjugated diene in the nitrile rubber may be of any kind. It is preferred to use ($C_4$-$C_6$) conjugated dienes. Particular preference is given to 1,2-butadiene, 1,3-butadiene, isoprene, 2,3-dimethylbutadiene, piperylene or mixtures thereof. More particular preference is given to 1,3-butadiene and isoprene or mixtures thereof. 1,3-Butadiene is especially preferred.

As α,β-unsaturated nitrile it is possible to use any known α,β-unsaturated nitrile, preference being given to ($C_3$-$C_5$) α,β-unsaturated nitriles such as acrylonitrile, methacrylonitrile, ethacrylonitrile or mixtures thereof. Acrylonitrile is particularly preferred.

One particularly preferred nitrile rubber is a copolymer of acrylonitrile and 1,3-butadiene.

As further copolymerizable termonomers it is possible to make use, for example, of aromatic vinylmonomers, preferably styrene, α-methylstyrene and vinylpyridine, fluorine-containing vinylmonomers, preferably fluoroethyl vinyl ether, fluoropropyl vinyl ether, o-fluoromethylstyrene, vinyl pentafluorobenzoate, difluoroethylene and tetrafluoroethylene, or else copolymerizable anti-ageing monomers, preferably N-(4-anilinophenyl)acrylamide, N-(4-anilinophenyl)methacrylamide, N-(4-anilinophenyl)cinnamides, N-(4-anilinophenyl)crotonamide, N-phenyl-4-(3-vinylbenzyloxy)aniline and N-phenyl-4-(4-vinylbenzyloxy)aniline, and also non-conjugated dienes, such as 4-cyanocyclohexene and 4-vinylcyclohexene, or else alkynes, such as 1- or 2-butyne.

Alternatively, as further copolymerizable termonomers, it is possible to use copolymerizable termonomers containing carboxyl groups, examples being α,β-unsaturated monocarboxylic acids, their esters, α,β-unsaturated dicarboxylic acids, their monoesters or diesters, or their corresponding anhydrides or amides.

As α,β-unsaturated monocarboxylic acids it is possible with preference to use acrylic acid and methacrylic acid.

It is also possible to employ esters of the α,β-unsaturated monocarboxylic acids, preferably their alkyl esters and alkoxyalkyl esters. Preference is given to the alkyl esters, especially $C_1$-$C_{18}$ alkyl esters, of the α,β-unsaturated monocarboxylic acids, Particular preference is given to alkyl esters, especially $C_1$-$C_{18}$ alkyl esters, of acrylic acid or of methacrylic acid, more particularly methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylates, butyl methacrylate and 2-ethylhexyl methacrylate. Also preferred are alkoxyalkyl esters of the α,β-unsaturated monocarboxylic acids, more preferably alkoxyalkyl esters of acrylic acid or of methacrylic acid, more particular $C_2$-$C_{12}$ alkoxyalkyl esters of acrylic acid or of methacrylic acid, very preferably methoxymethyl acrylate, methoxyethyl (meth)acrylate, ethoxyethyl (meth)acrylate and methoxyethyl (meth)acrylate. Use may also be made of mixtures of alkyl esters, such as those mentioned above, for example, with alkoxyalkyl esters, in the form of those mentioned above, for example. Use may also be made of cyanoalkyl acrylate and cyanoalkyl methacrylates in which the C atom number of the cyanoalkyl group is 2-12, preferably α-cyanoethyl acrylate, β-cyanoethyl acrylate and cyanobutyl methacrylate. Use may also be made of hydroxyalkyl acrylates and hydroxyalkyl methacrylate in which the C atom number of the hydroxyalkyl groups is 1-12, preferably 2-hydroxyethyl acrylate, 2-hydroxyethyl methacrylate and 3-hydroxypropyl acrylate; use may also be made of fluorine-substituted benzyl-group-containing acrylates or methacrylates, preferably fluorobenzyl acrylate, and fluorobenzyl methacrylate. Use may also be made of acrylates and methacrylates containing fluoroalkyl groups, preferably trifluoroethyl acrylate and tetrafluoropropyl methacrylate. Use may also be made of α,□β-unsaturated carboxylic esters containing amino groups, such as dimethylaminomethyl acrylate and diethylaminoethyl acrylate.

As other copolymerizable monomers it is possible, furthermore, to use α,β-unsaturated dicarboxylic acids, preferably maleic acid, fumaric acid, crotonic acid, itaconic acid, citraconic acid and mesaconic acid.

Use may be made, furthermore, of α,β-unsaturated dicarboxylic anhydrides, preferably maleic anhydride, itaconic anhydride, citraconic anhydride and mesaconic anhydride.

It is possible, furthermore, to use monoesters or diesters of α,β-unsaturated dicarboxylic acids.

These α,β-unsaturated dicarboxylic monoesters or diesters may be, for example, alkyl esters, preferably $C_1$-$C_{10}$ alkyl, more particularly ethyl, n-propyl, isopropyl, n-butyl, tert-butyl, n-pentyl or n-hexyl esters, alkoxyalkyl esters, preferably $C_2$-$C_{12}$ alkoxyalkyl, more preferably $C_3$-$C_8$-alkoxyalkyl, hydroxyalkyl, preferably $C_1$-$C_{12}$ hydroxyalkyl, more preferably $C_2$-$C_8$ hydroxyalkyl, cycloalkyl esters, preferably $C_5$-$C_{12}$ cycloalkyl, more preferably $C_6$-$C_{12}$ cycloalkyl, alkylcycloalkyl esters, preferably $C_6$-$C_{12}$ alkylcycloalkyl, more preferably $C_7$-$C_{10}$ alkylcycloalkyl, aryl esters, preferably $C_6$-$C_{14}$ aryl esters, these esters being monoesters or diesters, and it also being possible, in the case of the diesters, for the esters to be mixed esters.

Particularly preferred alkyl esters of α,β-unsaturated monocarboxylic acids are methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate, 2-propylheptyl acrylate and lauryl (meth)acrylate. More particularly, n-butyl acrylate is used.

Particularly preferred alkoxyalkyl esters of the α,β-unsaturated monocarboxylic acids are methoxyethyl (meth)acrylate, ethoxyethyl (meth)acrylate and methoxyethyl (meth)acrylate. More particularly, methoxyethyl acrylate is used.

Particularly preferred hydroxyalkyl esters of the α,β-unsaturated monocarboxylic adds are hydroxyethyl (meth)acrylate, hydroxypropyl (meth)acrylate and hydroxybutyl (meth)acrylate.

Other esters of the α,β-unsaturated monocarboxylic acids that are used are additionally, for example, polyethylene glycol (meth)acrylate, polypropylene glycol (meth)acrylate, glycidyl (meth)acrylate, epoxy (meth)acrylate, N-(2-hydroxyethyl)acrylamides, N-(2-hydroxy-methyl)acrylamides and urethane (meth)acrylate.

Examples of α,β-unsaturated dicarboxylic monoesters encompass maleic acid monoalkyl esters, preferably monomethyl maleate, monoethyl maleate, monopropyl maleate and mono-n-butyl maleate;

maleic acid monocycloalkyl esters, preferably monocyclopentyl maleate, monocyclohexyl maleate and monocycloheptyl maleate;

maleic acid monoalkyl cycloalkyl esters, preferably monomethyl cyclopentyl maleate and monoethyl cyclohexyl maleate;

maleic acid monoaryl esters, preferably monophenyl maleate;

maleic acid monobenzyl esters, preferably monobenzyl maleate;

fumaric acid monoalkyl esters, preferably monomethyl fumarate, monoethyl fumarate, monopropyl fumarate and mono-n-butyl fumarate;

fumaric acid monocycloalkyl esters, preferably monocyclopentyl fumarate, monocyclohexyl fumarate and monocycloheptyl fumarate;

fumaric acid monoalkyl cycloalkyl esters, preferably monomethyl cyclopentyl fumarate and monoethyl cyclohexyl fumarate;

fumaric acid monoaryl esters, preferably monophenyl fumarate;

fumaric acid monobenzyl esters, preferably monobenzyl fumarate;

citraconic acid monoalkyl esters, preferably monomethyl citraconate, monoethyl citraconate, monopropyl citraconate and mono-n-butyl citraconate;

citraconic acid monocycloalkyl esters, preferably monocyclopentyl citraconate, monocyclohexyl citraconate and monocycloheptyl citraconate;

citraconic acid monoalkyl cycloalkyl esters, preferably monomethyl cyclopentyl citraconate and monoethyl cyclohexyl citraconate;

citraconic acid monoaryl esters, preferably monophenyl citraconate;

citraconic acid monobenzyl esters, preferably monobenzyl citraconate;

itaconic acid monoalkyl esters, preferably monomethyl itaconate, monoethyl itaconate, monopropyl itaconate and mono-n-butyl itaconate;

itaconic acid monocycloalkyl esters, preferably monocyclopentyl itaconate, monocyclohexyl itaconate and monocycloheptyl itaconate;

itaconic acid monoalkyl cycloalkyl esters, preferably monomethyl cyclopentyl itaconate and monoethyl cyclohexyl itaconate;

itaconic acid monoaryl esters, preferably monophenyl itaconate;

itaconic acid monobenzyl esters, preferably monobenzyl itaconate.

Mesaconic acid monoalkyl esters, preferably mesaconic acid monoethyl esters;

As α,β-unsaturated dicarboxylic diesters it is possible to use the analogous diesters based on the abovementioned monoester groups, and the ester groups may also be chemically different groups.

The proportions of conjugated diene and α,β-unsaturated nitrile in the resultant NBR polymers may vary within wide ranges. The proportion of or the sum of the conjugated dienes is typically in the range from 40 to 90% preferably in the range from 50 to 85%, by weight, based on the overall polymer. The proportion of or the sum of the α,β-unsaturated nitriles is typically 10 to 60%, preferably 15 to 50%, by weight, based on the overall polymer. The proportions of the monomers add up in each case to 100% by weight. The additional monomers, depending on the nature of the termonomer or termonomers, may be present in amounts of 0% to 40% by weight, based on the overall polymer. In this case, corresponding proportions of the conjugated diene or dienes and/or of the α,β-unsaturated nitrile or nitriles are replaced by the proportions of the additional monomers, with the proportions of all the monomers adding up in each case to 100% by weight.

Where the termonomers are monomers of the kind that form tertiary radicals (e.g. methacrylic acid), it has been found appropriate to use them in amounts of 0% to 10% by weight.

It should be noted that the limitation given above for the additional monomers, to a maximum of 40%, applies only in the scenario where the total amount of monomers is metered in to the polymerization batch at the beginning or during the reaction (in other words in order to produce random terpolymer systems). It is of course possible, owing to the fact that a nitrile rubber has fragments of the regulator or regulators used in its main polymer chain and/or its end groups, for it to be employed as a macro-regulator and to be employed in any desired amount, by reaction with suitable monomers for the purpose, for example, of generating block systems.

The glass transition temperatures of the nitrile rubbers of the invention are situated in the range from −70° C. to +20° C., preferably in the −60° C. to 10° range.

Owing to the living nature of the polymerization in organic solution it is possible to obtain nitrile rubbers having an extremely narrow molecular weight distribution. Nitrile rubbers can be prepared that have a polydispersity index in the range from 1.1 to 2.5, preferably in a range from 1.3 to 2.4, more preferably in a range from 1.4 to 2.2, more particularly in a range from 1.5 to 2.0, very preferably in a range from 1.5 to less than 2. Through control of the concentration of regulator, the process of the invention permits very precise adjustment of the desired molecular weight and additionally, through the use of the regulators, also allows the construction of specific polymer architectures (e.g. preparation of blocks grafts on polymer backbones, surface attachment, and also other polymer modifications known to the skilled person) and also of targeted molecular weight distributions, from extremely narrow through to broad distributions, from monomodal via bimodal and through to multimodal distributions.

Polymerization to Nitrile Rubbers:

In the polymerisation resulting in the nitrile rubber it is preferred to use a regulator of the general formula (VI) wherein
Z and R possess the definitions stated above for the general formula (VI), and
n, m and l are all zero.

This preferred regulator therefore possesses the general structure (VIa):

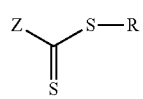
(VIa)

wherein the radicals Z and R may have any of the definitions stated above for the general formula (VI).

Trithiocarbonates:

As a further preferred regulator it is possible to use a regulator of the general formula (VIb)

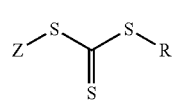
(VIb)

wherein
Z possesses the definitions stated above for the general formula (VI),
R possesses the definitions stated above for the general formula (VI) for the variant b) with m=0, albeit with the restriction that R, following homolytic fission of the S—R bond, forms alternatively a secondary, tertiary or aromatically stabilized radical.

This particularly preferred regulator of the general formula (VIb) is a product of the regulator of the general formula (VI) with
n and m each=0,
t is 1,
X is sulphur,
Z possesses the definitions stated above for the general formula (VI), and
R possesses the definitions stated above for the general formula (VI) for the variant b) with m=0, albeit with the restriction that R, following homolytic fission of the S—R bond, forms alternatively a secondary, tertiary or aromatically stabilized radical.

With these particularly preferred regulators of the general formula (VIb), therefore, depending on whether Z and R are identical or not in the context of the given definitions, are symmetrical or asymmetrical trithiocarbonates.

Particular preference is given to using a regulator of the general formula (VIb) where
Z possesses the definitions stated above for the general formula (VI), and
R, with the proviso that R, after homolytic fission of the S—R bond, forms alternatively a secondary, tertiary or aromatically stabilized radical, is
a linear or branched, saturated or mono- or polyunsaturated, optionally singly or multiply substituted alkyl radical, preferably a corresponding $C_3$-$C_{20}$-alkyl radical, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or
a saturated or mono- or polyunsaturated, optionally singly or multiply substituted carbocyclyl or heterocyclyl radical, more particularly cyclohexyl, cumyl or cyclohexane-1-nitrile-1-yl,
a (hetero)aryl radical, very preferably a $C_6$-$C_{24}$-(hetero)aryl radical, more particularly phenyl, pyridinyl or anthracenyl,
a (hetero)aralkyl radical, very preferably benzyl, phenylethyl or 1-methyl-1-phenyleth-2-yl, or
a thiocarboxyll, carbonyl, carboxyl, oxo, thioxo, epoxy, and also salts of the aforementioned compounds.

More particular preference is given, furthermore, to using a regulator of the general formula (VIb) wherein
Z possesses the definitions stated above for the general formula (VI), albeit likewise with the additional restriction to those definitions whereby Z, following homolytic fission of the Z—S bond, forms alternatively a secondary, tertiary or aromatically stabilized radical.

In that case, in the trithiocarbonate regulator, both radicals, R and Z, have a polymerization-initiating effect.

Very particular preference is given, furthermore, to using a regulator of the general formula (VIb) wherein
R and Z are alike or different, and with the proviso that R and Z, following homolytic fission of the R—S or Z—S bond, respectively, each form a secondary, tertiary or aromatically stabilized radical, are
a linear or branched, saturated or mono- or polyunsaturated, optionally singly or multiply substituted alkyl radical, preferably a corresponding $C_3$-$C_{20}$-alkyl radical, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or a saturated or mono- or polyunsaturated, optionally singly or multiply substituted carbocyclyl or heterocyclyl radical, more particularly cyclohexyl, cumyl or cyclohexane-1-nitrile-1-yl, a (hetero)aryl radical, very preferably a $C_6$-$C_{24}$-(hetero)aryl radical, more particularly phenyl, pyridinyl or anthracenyl, a (hetero)aralkyl radical, very preferably benzyl, phenylethyl or 1-methyl-1-phenyleth-2-yl, or a thiocarboxyll, carbonyl, carboxyl, oxo, thioxo, epoxy, and also salts of the aforementioned compounds.

With regard to the formulations, as used for the general formula (VIb) and subsequently for the general formulae (VIc), (VId) and (VIe), "that R, following homolytic fission of the R—S bond, forms a secondary or tertiary radical", the definitions below apply. They likewise apply, analogously, to the corresponding formulation "that Z, following homolytic fission of the Z—S bond, forms a secondary or tertiary radical", where that formulation is used in the context of the specification in connection with Z.

The atom in the radical R that produces the bond to S in the general formula (VIb) (and, respectively, in the subsequent general formulae (VIc), (VId) and (VIe)), leads then, on homolytic fission of the R—S bond, to a radical which is referred to as "tertiary" when this atom has attached to it (with the exception of the bond to the sulphur) at least (i) three substituents via single bonds, or (ii) one substituent via a single bond and a further substituent via a double bond, or (iii) one substituent via a triple bond, all of the aforementioned substituents necessarily being other than hydrogen.

The atom in the radical R that produces the bond to S in the general formulae (VIb), (VIc), (VId) and (VIe) leads then, on homolytic fission of the R—S bond, to a radical identified as being "secondary", when attached to said atom there (i) are two substituents via single bonds or (ii) is one substituent via a double bond, it being necessary for all of the aforementioned substituents to be other than hydrogen, and all further possible substituents being H.

Examples of radicals R or Z which on homolytic fission of the R—S(or Z—S) bond result in a radical referred to as "tertiary" are, for example, tert-butyl, cyclohexane-1-nitrile-1-yl and 2-methylpropanenitrile-2-yl.

Examples of radicals R or Z which on homolytic fission of the R—S(or Z—S) bond result in a radical referred to as "secondary" are, for example, sec-butyl, isopropyl and cycloalkyl, preferably cyclohexyl.

With regard to the proviso as used below for the formula (VId) to the effect "that Z, following homolytic fission of the Z—S bond, forms a primary radical", the following definition applies: the atom in the radical Z that produces the bond to S in the general formula (VId) results, on homolytic fission of the Z—S bond, in a radical referred to as "primary" when this atom has attached to it, via a single bond, no substituent or not more than one substituent, which is not hydrogen. For Z=H, the above proviso is considered by definition to have been met.

Examples of radicals Z which result, on homolytic fission of the Z—S bond, in a radical referred to as "primary" are, therefore, for example, H, linear $C_1$-$C_2$ alkyl radicals, OH, SH, SR and $C_2$-$C_{20}$ alkyl radicals with branches beyond the C Atom that produces the bond to S.

Dithioesters:

A further preferred regulator which can be used is a regulator of the general formula (VIc)

(VIc)

Z possesses the definitions stated above for the general formula (VI),

R possesses the definitions stated above for the general formula (VI) for the variant b) with m=0, albeit with the restriction that R, following homolytic fission of the S—R bond, forms alternatively a secondary, tertiary or aromatically stabilized radical.

This particularly preferred regulator of the general formula (VIc) is a product of the regulator of the general formula (VI) where n and m are each=0, t is 1, X is $C(Z)_2$, Z possesses the definitions stated above for the general formula (VI), and R possesses the definitions stated above for the general formula (VI) for the variant b) with m=0, albeit with the restriction that R, following homolytic fission of the S—R bond, forms alternatively a secondary, tertiary or aromatically stabilized radical.

Particular preference is given to using a regulator of the general formula (VIc) wherein R with the proviso that R, following homolytic fission of the S—R bond, forms alternatively a secondary, tertiary or aromatically stabilized radical, is a linear or branched, saturated or mono- or polyunsaturated, optionally singly or multiply substituted alkyl radical, preferably a corresponding $C_3$-$C_{20}$-alkyl radical, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or a saturated or unsaturated, optionally singly or multiply substituted carbocyclyl or heterocyclyl radical, more particularly cyclohexyl, cumyl or cyclohexane-1-nitrile-1-yl, a (hetero)aryl radical, very preferably a $C_6$-$C_{24}$-(hetero)aryl radical, more particularly phenyl, pyridinyl or anthracenyl, a (hetero)arylalkyl radical, very preferably a $C_7$-$C_{25}$-(hetero)arylalkyl radical, more particularly benzyl, phenylethyl or 1-methyl-1-phenyleth-2-yl, or a thiocarboxyl, carbonyl, carboxyl, oxo, thioxo, epoxy, and also salts of the aforementioned compounds.

Asymmetrical Trithiocarbonates:

In another preferred embodiment, at least one regulator of the general formula (VId) is used,

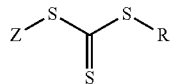
(VId)

in which

Z possesses the definitions stated above for the general formula (VI) albeit with the restriction that Z, following homolytic fission of the S—Z bond, forms a primary radical, and R may possess the same definitions as Z in the general formula (VI), albeit with the restriction that R, following homolytic fission of the S—R bond, forms alternatively a secondary, tertiary or aromatically stabilized radical, and with the additional proviso that Z and R adopt different definitions.

This preferred regulator of the general formula (VId) is a product of the regulator of the general formula (VI) where n and m are each=0, t is 1, X is sulphur, Z possesses the definitions stated above for the general formula (VI), albeit with the restriction that Z, following homolytic fission of the S—Z bond, forms a primary radical, and R may possess the same definitions as Z in the general formula (VI), albeit with the restriction that R, following homolytic fission of the S—R bond, forms alternatively a secondary, tertiary or aromatically stabilized radical.

These particularly preferred regulators of the general formula (VId) are therefore asymmetrical trithiocarbonates.

Particular preference is given to a regulator of the above-mentioned general formula (VId) in which Z with the proviso that Z, following homolytic fission of the S—Z bond, forms a primary radical, is H, a linear or branched, saturated or mono- or polyunsaturated, optionally singularly or multiply substituted alkyl radical, very preferably a corresponding $C_1$-$C_{16}$alkyl radical, more particularly methyl, ethyl, n-prop-1-yl, but-2-en-1-yl, n-pent-1-yl, n-hex-1-yl or n-dodecan-1-yl, aralkyl, very preferably $C_7$-$C_{25}$-aralkyl, more particularly benzyl, amino, amido, carbamoyl, hydroxyimino, alkoxy, aryloxy, F, Cl, Br, I, hydroxyl, alkylthio, arylthio, carbonyl, carboxyl, oxo, thioxo, cyanates, thiocyanates, isocyanates, thioisocyanates, isocyanides or salts of the stated compounds, and R with the proviso that R, following homolytic fission of the S—R bond, forms alternatively a secondary, tertiary or aromatically stabilized radical, is a linear, branched or cyclic, saturated or mono- or polyunsaturated, optionally singly or multiply substituted alkyl radical, preferably a corresponding $C_3$-$C_{20}$-alkyl radical, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H, 1H,2-keto-3-oxo-4H,4H,5H,5H-perfluoroundecanyl, or a saturated or unsaturated, optionally singly or multiply substituted carbocyclyl or heterocyclyl radical, more particularly cyclohexyl, cumyl or cyclohexane-1-nitrile-1-yl, a (hetero)aryl radical, very preferably a $C_6$-$C_{24}$-aryl radical, more particularly phenyl, pyridinyl or anthracenyl, an aralkyl radical, very preferably benzyl, phenylethyl or 1-methyl-1-phenyleth-2-yl, or a thiocarboxyll, carbonyl, carboxyl, oxo, thioxo, epoxy, and also salts of the aforementioned compounds.

Dithioesters:

In a further preferred embodiment, at least one regulator of the general formula (VIe) is used,

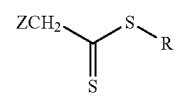
(VIe)

in which

Z may possess any of the definitions stated for the general formula (VI), and

R may possess the same definitions as Z in the general formula (VI), albeit with the restriction that R, following homolytic fission of the S—R bond, forms alternatively a secondary, tertiary or aromatically stabilized radical.

This preferred regulator of the general formula (VIe) is a product of the regulator of the general formula (VI) where n and m are each=0, t is 1, X is $CH_2$, Z possesses the definitions stated above for the general formula (VI), and R may possess the same definitions as Z in the general formula (VI), albeit with the restriction that R, following homolytic fission of the S—R bond, forms alternatively a secondary, tertiary or aromatically stabilized radical.

Particular preference is given to a regulator of the above-mentioned general formula (VIe) in which R with the proviso that R, following homolytic fission of the S—R bond, forms alternatively a secondary, tertiary or aromatically stabilized radical, is a linear or branched, saturated or mono- or polyunsaturated, optionally singly or multiply substituted alkyl radical, preferably a corresponding $C_3$-$C_{20}$-alkyl radical, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or a saturated or unsaturated, optionally singly or multiply substituted carbocyclyl or heterocyclyl radical, more particularly cyclohexyl, cumyl or cyclohexane-1-nitrile-1-yl, a (hetero)aryl radical, very preferably a $C_6$-$C_{24}$-(hetero) aryl radical, more particularly phenyl, pyridinyl or anthracenyl, a (hetero)arylalkyl radical, very preferably a $C_7$-$C_{25}$-(hetero)arylalkyl radical, more particularly benzyl, phenylethyl or 1-methyl-1-phenyleth-2-yl, or a thiocarboxyll, carbonyl, carboxyl, oxo, thioxo, epoxy, and also salts of the aforementioned compounds.

All of the aforementioned regulators can be synthesized by methods familiar to the skilled person from the prior art. Synthesis procedures and further references to preparation instructions may be found, for example, in Polymer 49 (2008) 1079-1131, WO-A-98/01478 and in other literature references and patents as cited in the prior patent application by applicant hereof mentioned above. A number of the regulators are also already available commercially.

Particularly suitable as regulators for the process of the invention are dodecylpropanoic acid trithiocarbonate (Do-PAT), dibenzoyl trithiocarbonate (DiBenT), cumyl phenyl dithioacetate (CPDA), cumyl dithiobenzoate, phenyl ethyl dithiobenzoate, cyanisopropyl dithiobenzoate, 2-cyanoethyl dithiobenzoate, 2-cyanoprop-2-yl dithiophenylacetate, 2-cyanoprop-2-yl dithiobenzoate, S-thiobenzoyl-1H,1H, 2-keto-3-oxa-4H,4H,5H,5H-perfluoroundecanethiol and S-thiobenzoyl-1-phenyl-2-keto-3-oxa-4H,4H,5H,5H-perfluoroundecanethiol.

It is usual to use 5 to 2000 mol % of the regulator per mole of the initiator. Preference is given to using 20 to 1000 mol % of the regulator per mole of the initiator.

Initiators:

The initiation of the free-radical polymerization resulting in the nitrile rubbers subjected to the process according to the invention is not critical, and hence contemplation may be given to initiation by peroxidic initiators, azo initiators, redox systems or photochemical initiation. Among these initiators, the azo initiators are preferred.

Azo initiators which can be used are, for example, the following compounds:

2,2'-azobis(isobutyronitrile), 2,2'-azobis(2-cyano-2-butane), dimethyl 2,2'-azobisdimethyliso-butyrate, 4,4'-azobis (4-cyanopentanoic acid), 1,1- azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl)]propionamide, 2,2'-azobis(N,N-dimethyleneisobutyramidine)dihydrochloride, 2,2'-azobis(2-amidinopropane) dihydrochloride, 2,2'-azobis (N,N'-dimethyleneisobutyramine), 2,2'-azobis(2-methyl-N-[1,1-bis(hydroxymethyl)-2-hydroxyethyl] propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide) dihydrate, 2,2'-azobis (2,2,4-trimethylpentane) and 2,2'-azobis(2-methylpropane).

The azo initiators are used typically in an amount of $10^{-4}$ to $10^{-1}$ mol/l, preferably in an amount of $10^{-3}$ to $10^{-2}$ mol/l. By harmonizing the proportion of the amount of initiator used to the amount of the regulator used, success is achieved in specifically influencing not only the reaction kinetics but also the molecular structure (molecular weight, polydispersity).

Peroxidic initiators that can be used include, for example, the following peroxo compounds, containing an —O—O unit: hydrogen peroxide, peroxodisulphates, peroxodiphosphates, hydroperoxides, peracids, peracid esters, peracid anhydrides and peroxides having two organic radicals. As salts of peroxodisulphuric acid and of peroxodiphosphoric acid it is possible to use sodium, potassium and ammonium salts. Examples of suitable hydroperoxides include t-butyl hydroperoxide, cumene hydroperoxide, pinane hydroperoxide and p-menthane hydroperoxide. Suitable peroxides having two organic radicals are dibenzoyl peroxide, 2,4,-dichlorobenzoyl peroxide, di-t-butyl peroxide, dicumyl peroxide, t-butyl perbenzoate, t-butyl peracetate. Preference is given to using p-menthane hydroperoxide or pinane hydroperoxide.

Redox systems which can be used are the following systems composed of an oxidizing agent and a reducing agent. The choice of suitable amounts of oxidizing agent and reducing agent is sufficiently familiar to the skilled person.

In the case where redox systems are used it is common to make additional use of salts of transition metal compounds such as iron, cobalt or nickel in combination with suitable complexing agents such as sodium ehylenediametetraacetate, sodium nitrilotriacetate and also trisodium phosphate or tetrapotassium diphosphate.

Oxidizing agents which can be used in this context include, for example, all peroxo compounds identified above for the peroxidic initiators.

Reducing agents which can be used in the process of the invention include, for example, the following: sodium formaldehydesulphoxylate, sodium benzaldehydesulphoxylate, reducing sugars, ascorbic acid, sulphenates, sulphinates, sulphoxylates, dithionite, sulphite, metabisulphite, disulphite, sugars, urea, thiourea, xanthogenates, thioxanthogenates, hydrazinium salts, amines and amine derivatives such as aniline, dimethylaniline, monoethanolamine, diethanolamine or triethanolamine. Preference is given to using sodium formaldehydesulphoxylate.

The free-radical polymerization may also be initiated photochemically as described below: for this purpose a photoinitiator is added to the reaction mixture, the photoinitiator being excited by exposure to light of appropriate wavelength, and initiating a free-radical polymerization. Here it should be noted that for the optimum initiation of the free-radical polymerization, the irradiation time is dependent on the power of the radiation source, on the distance between the source and the reaction vessel, and on the area of irradiation. To the skilled person, however, it is readily possible, by means of various test series, to determine the optimum irradiation time. The choice of the suitable amount of initiator is also possible without problems to a skilled person, and is used to influence the time/conversion behaviour of the polymerization.

Examples of photochemical initiators which can be used include the following: benzophenone, 2-methylbenzophenone, 3,4-dimethylbenzophenone, 3-methylbenzophenone, 4,4'-bis(diethyl amino)benzophenone, 4,4'-dihydroxybenzophenone, 4,4'-bis[2-(1-propenyl)phenoxy] benzophenone, 4-(diethylamino)benzophenone, 4-(dimethylamino)benzophenone, 4-benzoylbiphenyl, 4-hydroxybenzophenone, 4-methylbenzophenone, benzophenone-3,3',4,4'-tetracarboxylic dianhydride, 4,4'-bis(dimethylamino)benzophenone, acetophenone, 1-hydroxycyclohexyl phenyl ketone, 2,2-diethoxyacetophenone, 2,2-dimethoxy-2-phenylacetophenone, 2-benzyl-2-(dimethylamino)-4'-morpholinobutyrophenone, 2-hydroxy-2-methylpropiophenone, 2-hydroxy-4'-(2-hydroxyethoxy)-2-methylpropiophenone, 3'-hydroxyacetophenone, 4'-ethoxyacetophenone, 4'-hydroxyacetophenone, 4'-phenoxyacetophenone, 4'-tert-butyl-2',6'-dimethyacetophenone, 2-methyl-4'-(methylthio)-2-morpholinopropiophenone, diphenyl(2,4,6-trimethylbenzoyl)phosphine oxide, phenylbis(2,4,6-trimethylbenzoyl)phosphine oxide, methyl benzoylformate, benzoin, 4,4'-dimethoxybenzoin, benzoin methyl ether, benzoin ethyl ether, benzoin isopropyl ether, benzoin isobutyl ether, 4,4'-dimethylbenzyl, hexachlorocyclopentadienes or combinations thereof.

Solvents:

The free-radical polymerization resulting in the nitrile rubbers subjected to the process according to the invention is performed in at least one organic solvent. Large amounts of water, as in the case of known NBR-emulsion polymerization, are therefore not present in the reaction system. Smaller amounts of water, in the order of magnitude of up to 5% by weight, preferably up to 1% by weight, based on the amount of organic solvent, may well be present in the reaction system. What is critical is that the amounts of water present should be kept so low that there is no precipitation of the NBR polymer as it forms. Let it be clearly stated at this point that the process of the invention is not an emulsion polymerization.

Examples of suitable organic solvents include dimethylacetamide, monochlorobenzene, toluene, ethyl acetate and methyl ethyl ketone. Preference is given to polar solvents which have a Hildebrand solubility parameter $\delta\delta(\delta\delta = ((\Delta H_v - RT)/V_m)^{1/2}$ $[(MPa)^{1/2}])$ ($V_m$=molar volume; $\Delta H_v$=enthalpy of vaporization; R=ideal gas constant)) in a range between 15.5 and 26 $(MPa)^{1/2}$.

Critical to the suitability of a solvent is that the nitrile rubber prepared should remain completely in solution at the reaction temperature, which is usually in the lower stated range.

It is not possible to use those solvents which intervene in the reaction as transfer reagents, such as carbon tetrachloride, thiols and other solvents known to the skilled person to be solvents of that kind.

Polymerisation Temperature and Dosing:

The free-radical polymerization resulting in the nitrile rubbers subjected to the process according to the invention is performed at a temperature in range from 60 to 150° C., preferably in a range from 70 to 130° C., more preferably in a range from 80 to 120° C., and more particularly in a range from 90 to 110° C. If the temperature selected is even lower, the polymerization is slowed down correspondingly. At temperatures which are significantly higher, it is possible that the initiator used may decompose too rapidly or that the RAFT agent is decomposed. Particularly when using peroxidic initiators, it is possible that, in certain circumstances, the regulator may be oxidized.

In the case of initiation by peroxo compounds or by azo initiators, the polymerization is typically such that the α,β-unsaturated nitrile and the other copolymerizable monomers employed optionally, the solvent, the initiator and also the regulator(s) are charged to a reaction vessel and then the conjugated diene or dienes is or are metered in. The polymerization is subsequently started by an increase in temperature.

In the case of initiation by means of a redox system, the oxidizing agent is typically metered into the reaction vessel together with one of the monomers. The polymerization is subsequently started by addition of the reducing agent.

In order to obtain specific proportions of the respective monomers in the co/terpolymer, it is sensible, and entirely familiar to the skilled person, to make appropriate modifications concerning metered addition (for example, by subsequently metering in more of the respective monomer or else by subsequently metering in quantities of initiator).

Equipment Suited for the Process of the Present Invention:

The equipment suitable to perform the process according to the invention will be described in more detail by means of schematic drawings in which.

Figure 1:
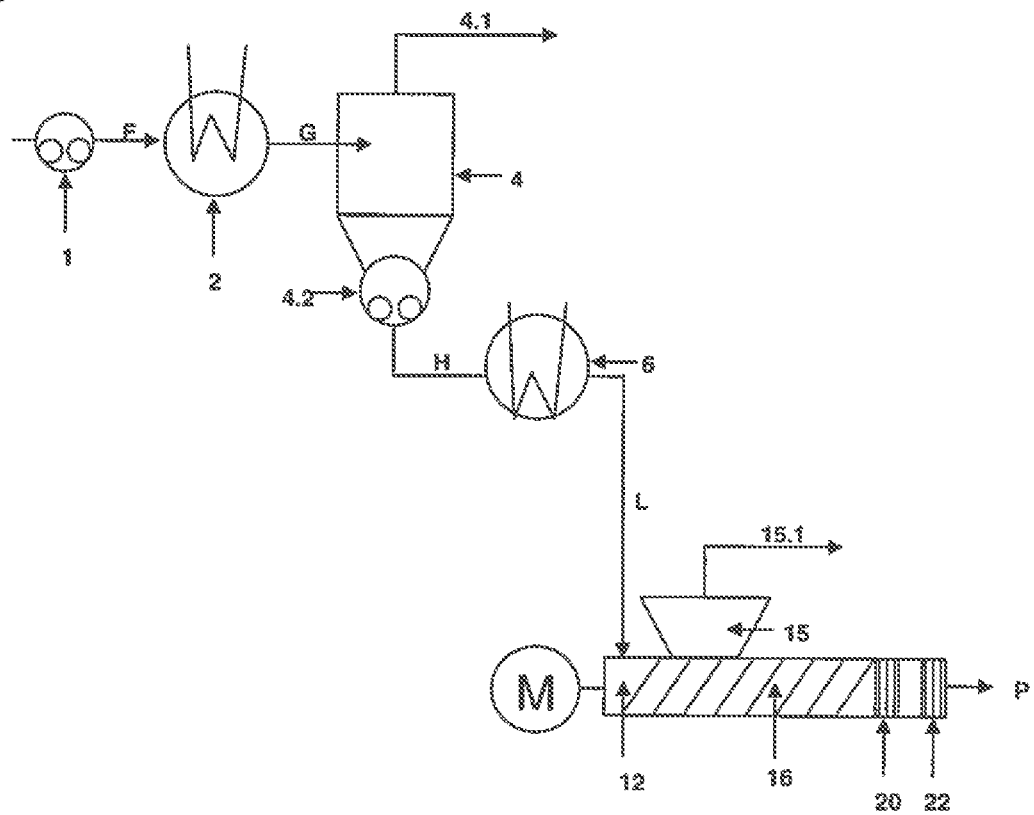
FIG. 1 shows a single-stage concentrator unit, a reheating unit and an extruder unit comprising one extruder degassing section, one accumulating section and one outlet section.

A Basic and Exemplary Embodiment of the Process Step is Shown in FIG. 1:

In step a) Fluid F containing at least one non-volatile nitrile rubber and at least one volatile compound is transferred via pump 1 to the heater 2, where the fluid F is heated.

Fluid F, also called cement, contains e.g. from 3 to 50 wt % of a non-volatile nitrile rubber, and from 50 to 97 wt % volatile compounds, in particular an organic solvent, whereby the aforementioned components add up to 90 to 100, preferably 95 to 100 wt % of the total mass of fluid F.

The solvent is preferably selected from the group comprising dimethylacetamide, monochlorbenzene, toluene, ethylacetate and methylethylketon. Another preferred embodiment of the present process is performed using polar solvents having a Hildebrand'schen Lösungsparameter $\delta(\delta=((\Delta H_v - RT)/V_m)^{1/2}[(MPa)^{1/2}])$ ($V_m$=molar Volume; $\Delta H_v$=evaporation enthalpy; R=ideal gas constant)) in the range of from 15.5 and 26 $(MPa)^{1/2}$.

In a preferred embodiment of the invention, fluid F contains from 3 to 40 wt % of a non-volatile nitrile rubber from 59.5 to 95 wt % volatile organic compounds, comprising in particular an organic solvent, and from 0.05 to 5 wt % water, whereby the aforementioned components add up to 95 to 100 wt % of the total mass of fluid F.

The fluid F is typically obtained from the polymerization process and/or subsequent processing steps e.g. comprising the removal of unreacted monomers. Fluids F may contain water as a side product. In rare cases it is not excluded that water may be contained in Fluid F, if steam stripping processes have been formed following the polymerization.

Temperature of Fluid F:

The fluid F entering the heater typically has a temperature of from 10° C. to 100° C., preferably of from 30° C. to 80° C.

The viscosity of fluid F is for example in the range of 50 mPa*s to 75,000 mPa*s, preferably in the range of 500 mPa*s to 15,000 mPa*s and more preferably 1000 mPa*s to 10,000 mPa*s.

A heater may be any device that is able to raise the temperature of Fluid F. In a preferred embodiment, heater 2 is a heat exchanger. The heating medium is selected from the group consisting of steam, heating oil or hot pressurized water. The heat exchanger is e.g. of shell-and-tube type, where the fluid F is inside the tubes and the heating medium is on the shell side. Special inserts in the tubes may be applied to enhance heat transfer. Another type of heat exchanger may also be used, in which fluid F is on the outside of the heat exchanger tubes. The advantage of the aforementioned types of heat exchangers is the avoidance of maldistribution and easy maintenance as well as good heat transfer. Said heat exchangers are well known and commercially available. In a less preferred embodiment Plate type heat exchangers may also be applied.

Temperature of Heated Fluid G:

Upon healing, heated fluid G is obtained. The heated fluid G has a higher temperature than fluid F, preferably a temperature of 100 to 200° C., more preferably 110° C. to 190° C. and even more preferably 120° C. to 175° C. The heated fluid G is then conveyed further into a degassing vessel 4. In the degassing vessel, the volatile compounds at least partially evaporate. The vapors are separated and removed from the heated fluid G by a vacuum line 4.1. The pressure in the degassing vessel 4 is for example in the range of 100 hPa to 4,000 hPa, preferably in the range of 200 hPa and 2,000 hPa and more preferred in the range of 230 to 1,100 hPa.

The vapors removed via the vacuum line 4.1 are preferably condensed and recycled into the process for preparation of fluid F. After degassing and separation a concentrated fluid H is obtained, which s removed from the degassing vessel 4 by means of a pump 4.2.

In a preferred embodiment of the invention the degassing vessel is designed in the shape of a cyclone to further aid separation of vapor from heated fluid G. In another preferred embodiment of the invention the degassing vessel 4 has a conical or at least torispherical shaped bottom, to allow the vessel being emptied completely or substantially complete.

In another embodiment the inner surface of the degassing vessel can be heated.

The pump 4.2 is preferably directly connected to the outlet of the degassing vessel 4. In general, the connection piece between pump and vessel is preferably as short as possible. Due to the high viscosity of the concentrated fluid H at this stage, the inlet of the pump is preferably designed with a large inlet, thereby reducing the pressure drop at the inlet.

The pump 4.2 may be selected from the group consisting of positive displacement type pumps, gear pumps, piston pumps, membrane pumps, screw type pumps, extruder type pumps like counter-rotating or co-rotating single or twin screw extruders or kneader type pumps. Positive displacement type pumps and gear pumps are preferred, gear pumps are even more preferred.

In another preferred embodiment the pump 4.2 comprises a combination of an extruder or a kneader and a gear pump whereby the gear pump is fed from the extruder or kneader.

The amount of volatile compounds that is removed in this step a) is for example dependent on the temperature of fluid G and the pressure in the degassing vessel 4. In a preferred embodiment of the invention the temperature of fluid G and the pressure in the degassing vessel 4 are chosen so that the concentrated fluid H is still free-flowing as defined above and comprises for example from 10 to 60, preferably from 25 to 60 wt % of a non-volatile nitrile rubber and from about 40 to about 90, preferably from 40 to 75 wt % volatile compounds whereby the aforementioned components non-volatile nitrile rubber polymer, volatile organic compound and water add up to 90 to 100 wt %, preferably to 95 to 100 wt % of the total mass of fluid H.

Temperature of Concentrated Fluid H:

The temperature of the concentrated fluid H is lower than that of heated fluid G and is for example in the range of 15 to 150° C., preferably in the range of 30 to 130° C. and more preferably in the range of 40 to 120° C. The concentrated fluid H is still free-flowing as defined above.

Step b) of the Process According to the Invention:

In step b), the concentrated fluid H obtained in step a) is then passed through a reheating unit 6 to obtain a reheated concentrated fluid L. The a preferred embodiment the reheating unit comprises a heat exchanger, whereby the same disclosure including the preferences with regard to heating media and heat exchanger types apply as described above for heat exchanger 2.

Temperature of Reheated Concentrated Fluid H:

The temperature of the reheated concentrated fluid L is higher than that of the concentrated fluid L and is for example in the range 50° C. to 200° C., preferably in the range of 80° C. to 180° C. and more preferably in the range of 90 to 130° C. The reheated concentrated fluid L is still free-flowing as defined above.

Step c) of the Process According to the Invention:

In step c), the reheated concentrated fluid L obtained in step b) is passed on to a extruder unit and fed into the conveying section 16 of the extruder degassing section at the feeding point 12.

Suitable extruder types include single screw and multi-screw extruders comprising any number of barrels and types of screw elements and other single or multishaft conveying kneaders. Possible embodiments of multiscrew extruders are twin-screw extruders, ring extruders or planetary roller extruders, whereby twin-screw extruders and planetary roller extruders are preferred. Single screw extruders include those having an axial oscillating screw. Twin screw extruders are for example counter-rotating intermeshing, counter-rotating non-intermeshing, co-rotating intermeshing and co-rotating non-intermeshing twin screw extruders, whereby co-rotating intermeshing twin screw extruders are preferred.

In a further embodiment of the present process it is also possible to use two or more of the above described extruders in a consecutive manner.

In one embodiment of the invention the extruders can either be heated via the barrels to temperatures up to 300° C. or cooled.

In a preferred embodiment, the extruder comprises means to operate separate zones independently of each other at different temperatures so that the zones can either be heated, unheated or cooled. In another preferred embodiment the extruder comprises for each conveying section at least one separate zone, which can be operated independently at different temperatures.

Preferred extruder materials should be non-corrosive and should substantially prevent the reheated concentrated fluid L and the Product P from being contaminated with metal or metal ions. Preferred extruder materials include nitrided steel, duplex steel, stainless steel, nickel-based alloys, composite materials like sintered metals, hot isostatic pressed materials, hard wear resistant materials like Stellite, coated metals with coatings for example made from ceramics, titanium nitride, chromium nitride and diamond like carbon (DLC).

The conveying section 16 is open to a vent port 15. In the conveying section 16 a part of the solvent is evaporated and separated from the reheated concentrated fluid L. The vapors are removed through the vent port 15 via a vapor line 15.1.

Since the evaporation volatile compounds have a tendency to entrain the reheated concentrated fluid L or the Product P towards the vent ports, in a preferred embodiment of the invention the vent ports 15 are designed to prevent the material, in particular the reheated concentrated fluid L or the Product P, from coming out of the vent ports.

Suitable means to accomplish that purpose are stuffer screws, that are mounted on the vent ports and convey any material back into the extruder, or rollers or belts, that are applied to the inside of the vent ports to push deposited material back into the extruder. As an alternative or in addition to the aforementioned, coatings of the vent ports may be applied which reduce or prevent sticking of the material to the surface. Suitable coatings include DLC, Ethylene-Tetrafluoroethylene (ETFE), Polytetrafluoroethylene (PTFE) and Nickel-Alloys.

The pressure at the vent port 15 is for example between 1 hPa and 2,000 hPa, preferably between 5 hPa and 900 hPa.

The vapor line 15.1 may be and is preferably connected to a condensing system.

In general, the purpose of the condensing system is to collect volatile compounds removed by the vent ports via the vapour lines and typically comprises a condenser and a vacuum pump. Any condensing system known in the art may be used to effect the recovery of volatile compounds.

Generally, it is preferred to recycle the condensed volatile compounds, optionally after carrying out a phase separation to separate the volatile organic compounds from water, into a process for the preparation of fluid F.

The conveying section 16 is terminated by a accumulating section 20. The purpose of the accumulation is to assure a certain pressure level in the vent port 15 and to introduce mechanical energy into the material to facilitate evaporation of volatile compounds. The accumulating section 20 may comprise any means that enable the accumulation of the material. It may be designed to include for example kneading or throttling elements, blister discs or die plates.

Examples of throttling elements are conical or cylindrical flow paths or other throttling means.

The application of kneading elements, blister discs or die plates within the accumulating section is preferred, kneading elements are even more preferred. Examples of kneading elements include kneading blocks, which may be designed as double or triple flighted forward, backward or neutral conveying kneading blocks; single or double flighted screw mixing elements with grooves, single flighted tooth mixing elements, blister plates and single, double or triple flighted eccentric discs. The kneading elements may be assembled in any combination on the screw shafts of the extruder, in particular of an twin screw counter rotating or co-rotating twin screw extruder.

A typical accumulating section comprises of 2 to 10 kneading blocks, oftentimes terminated by a back conveying type of kneading element. For mixing in of a stripping agent, tooth type elements or screw elements with grooves may be applied.

Eccentric discs are preferably applied in the last section of the extruder, where the product P is highly viscous and substantially free of volatile compounds.

For planetary roller extruders, kneading elements like tooth shaped rollers are or rollers with grooves and clearances are preferred.

Generally the extruder unit may comprise one or more conveying sections and one or more accumulating sections, whereby the number is only limited by constructional constraints. A typical number of conveying sections and accumulating sections is 1 to 30, preferably 2 to 20 and more preferably 3 to 15.

The last accumulating section 20 is typically designed to form a product plug at the outlet of the extruder, thereby preventing surrounding air from entering the extruder. While passing from the conveying section 16 and the accumulating section 20 to the outlet section 22 the reheated concentrated fluid L undergoes a transition from the free-flowing reheated concentrated fluid L to the product P, which typically has depending on the molecular weight a honey-like, waxy or solid appearance.

In case the nitrile rubber, i.e. the product P has a solid appearance, the outlet section 22 typically comprises special means to allow the product to exit the extruder and optionally product processing equipment. Examples of suitable product processing equipment includes combinations of die plates and cutters, die plates und underwater-pelletizing means, means for crumb formation like screw elements with teeth and holes, turbulators which may be designed as cylinders with holes in it, whereby the product is pressed from the outside to the inside of the cylinder, and whereby a rotating knife inside the cylinder cuts the product into pieces; fixed knives placed at the end plate of the extruder, whereby the screw rotation causes the cutting action, which preferably is applied when working with twin screw co-rotating, single screw and planetary roller extruders.

To reduce the mechanical and thermal stress to the product, in a preferred embodiment of the invention the product processing equipment is combined with cooling means.

The cooling means comprises any means that allow the removal of heat from the product. Examples of cooling means include pneumatic crumb conveyers with convective air cooling, vibrating crumb conveyers with convective air cooling, vibrating crumb conveyer with cooled contact surfaces, belt conveyer with convective air cooling, belt conveyer with cooled belts, water spraying on hot crumbs upon outlet of the extruder and as already mentioned underwater-pelletizing means, whereby water serves as the coolant.

The product P may then be processed further for final packing and shipping. Nitrile rubber for example is cooled to a temperature of or below 60° C., formed into bales e.g. by a hydraulic press, and then packed into boxes or crates for shipment. In case product P has a honey-like appearance it is filled into drums.

In general, an increasing feed rate of the reheated concentrated fluid L at the feeding point 12 requires a corresponding increase in the screw speed of the extruder. Moreover, the screw speed determines the residence time of fluid L. Thus, the screw speed, feed rate and the extruder diameter are typically interdependent. Typically the extruder is operated in such a manner that the dimensionless throughput $V/n*d^3$, wherein V denotes the Volume flow rate, n the screw speed expressed in revolutions per minute and d the effective diameter of the extruder is adjusted to about 0.01 to about 0.2 preferably to about 0.015 to about 0.1. The maximum and minimum feed rates and extruder screw speeds are determined by for example the size of the extruder, the physical properties of the synthetic rubber product contained in Fluid L and the target values of remaining volatile compounds. Given these properties, however, the operating parameters can be determined by one skilled in the art by some initial experiments.

In one embodiment of the invention the extruder is operated at a feed rate of 5 to 25,000, preferably of 5 to 6,000 kilograms per hour.

Generally, the degassing in the extruder may be aided by the addition of a stripping agent that is removed together with other volatile compounds. Even though the stripping agent may be added anywhere in the extruder unit, the addition in one or more accumulating sections is preferred. In a more preferred embodiment a stripping agent is added in one or more accumulating sections except the last one (20).

Suitable stripping agents are substances that are inert to the reheated concentrated fluid (L) and (or the product (P) and have a vapor pressure greater than 100 hPa at 100° C. In the context of the invention, the term "inert" means that the stripping agent does not or virtually not react with the polymers contained in the reheated concentrated fluid (L) and/or the product (P). Suitable stripping agents are nitrogen, carbon dioxide, noble gases, propane, butane, water or a mixture of the aforementioned substances The amount of stripping agent may be 0.0001 to 10, preferably 0.001 to 5 and more preferably 0.1 to 2 wt-% based on the amount of the polymer product obtained at the outlet section.

The process according to the present may be performed in a device comprising a least one concentrating unit comprising a heater (2) in communication with a degassing vessel (4), whereby the bottom part of the degassing vessel (4) is in communication with a pump (4.2) the upper part of the degassing vessel (4) is in communication with at least one vapour line (4.1)

one heating unit (6) in communication with the pump (4.2) of the concentrating unit and a feeding point (12) on an extruder unit one extruder unit comprising at least one feeding point (12), one extruder degassing section (16), one accumulating section (20) and one outlet section (22), whereby the extruder degassing section (16) further comprises at least one vent port (15) connected to a vapour line (15.1).

In the context of this invention the term "in communication" includes direct or Indirect connections whereby indirect connections may be accomplished for example via tubes or pipes. The term "In communication" further includes the option that between the units or means in communication further units or means are arranged.

Figure 2:
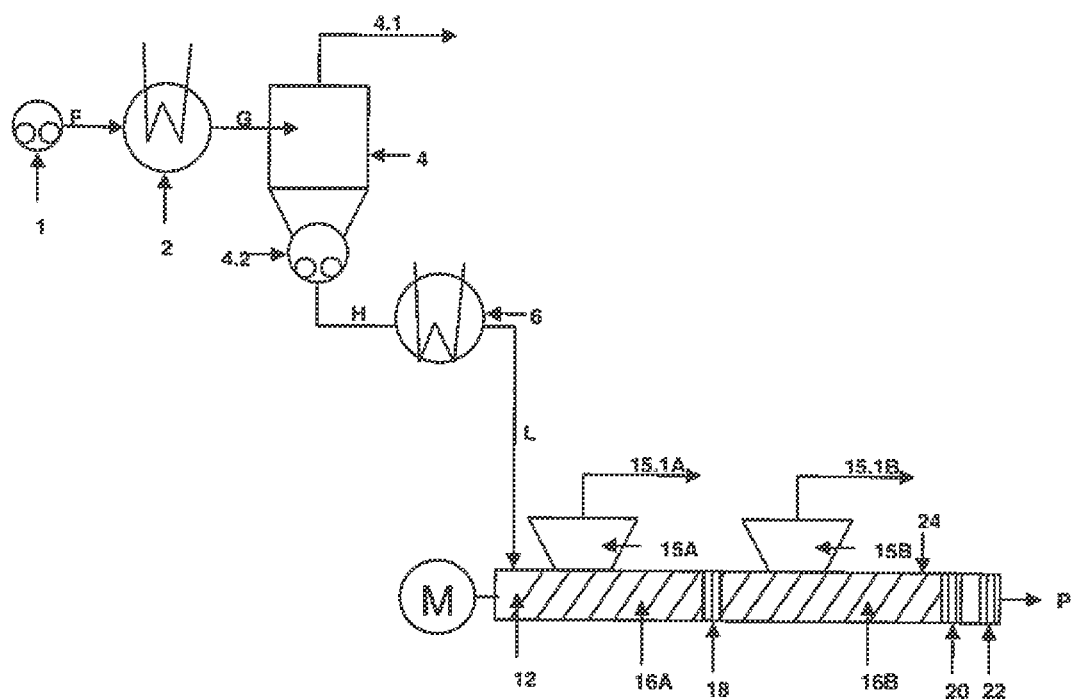
FIG. 2 shows a single-stage concentrator unit, a reheating unit and an extruder unit comprising two extruder degassing sections, two accumulating sections and one outlet section.

Another embodiment how to perform the process according to the invention is shown in FIG. 2 which shows another flow chart and suitable device for the accomplishment of the process according to the invention comprising a concentrator unit with a pump 1, a heater 2, a degassing vessel 4, a vapour line 4.1 and a pump 4.2, a reheating unit comprising a heater 6 and an extruder unit comprising two extruder degassing sections having two conveying sections 16A and 16B each connected to a vent port 15 A and 15 B and a vapour line 15.1A and 15.1.B, two accumulating sections 18 and 20 terminating the conveying sections 16 A and 18 B a an outlet section 22. In addition to that the extruder unit further comprises a side feeder 24.

Generally, the extruder unit may comprise one or more side feeders, which may positioned anywhere in the extruder, preferably in close proximity to the feeding point or the outlet section 22. Side feeders are suitable for the addition of additives to the polymer.

Examples of additives suited for nitrile rubber products include but are not limited to stabilizing agents, extender oils, stearates like calcium stearate, antioxidants and the like. Examples of suitable extender oils as e.g. phthalates, antioxidants include sterically hindered phenols like butylhydroxytoluenes (Vulkanox BHT) and its derivatives (like Irganox 1010 and 1076), amines (like Wingstay 29 a styrenated diphenylamine blend), certain phosphites (like TNPP (trisnonylphenylphosphite)) and the like.

In particular, nitrile rubbers can be mixed with e.g. 0.0001 to 5 phr calcium-stearate and/or 0.0001 to 1.0 phr of antioxidants and/or up to 100 phr, preferably 60 phr of extender oils (phr=parts per hundred rubber with respect to rubber weight). Other additives are also applicable, dependent on the application of the nitrile rubber product, i.e. fillers or extender oils.

As an alternative or in addition to that, additives may also already be added to the fluid F or, as far as they are liquid together with the stripping agent.

In a preferred embodiment of the process according to the invention step a) is repeated a least once, preferably once or twice. The advantage of repeating step a) is that the total energy consumption to produce the concentrated fluid H can significantly reduced due to easier operation parameter optimization for each concentration unit. The repetition of step a) is preferably accomplished by connecting the respective number of concentrating units in series.

Figure 4:
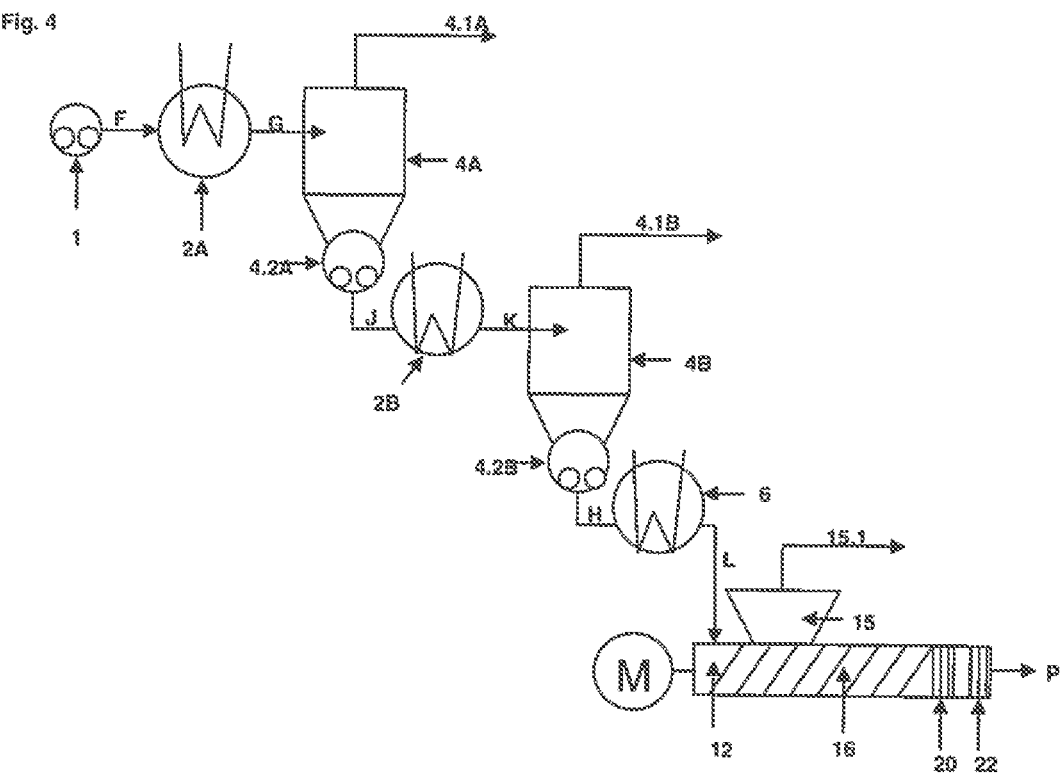
FIG. 4 shows a double-stage concentrator unit, a reheating unit and an extruder unit comprising one extruder degassing section, one accumulating section and an outlet section.

An Example of this Embodiment is Shown in FIG. 4.

FIG. 4 shows another flow chart and suitable device for the accomplishment of the process according to the invention comprising a double-stage concentrator unit with a pump 1, a first concentrator unit comprising heater 2A, degassing vessel 4A equipped with a vapour line 4.1A and a pump 4.2A, a second concentrator unit comprising heater 2B, degassing vessel 4B equipped with a vapour line 4.1B and a pump 4.2B, a reheating unit comprising a heater 6 and an extruder unit comprising two extruder degassing sections having two conveying sections 16A and 16B each connected to a vent port 15 A and 15 B and a vapour line 15.1A and 15.1.B, two accumulating sections 18 and 20 terminating the conveying sections 16 A and 16 B a an outlet section 22. The heated fluid G is subjected to the first concentration stage, thereby obtaining pre-concentrated fluid J, which is then reheated by heater 2B to obtain the reheated pre-concentrated fluid K, which is then subjected to the second concentration stage, whereby concentrated fluid H is obtained. Concentrated fluid H is then processed further as described above.

In a preferred embodiment of the process according to the invention the concentration unit, the reheating unit or the extruder unit may independently of each other be equipped with one or more pressure regulation devices which allow the very precise operation of the units under predefined conditions.

The pressure regulation devices may be active or passive, whereby active pressure regulation devices are preferred. Examples of active pressure regulation devices include control valves like a pressure relief valve, examples of passive pressure regulation devices include nozzles and dies or orifice plates. Suitable valves may be selected from ball, piston, gate or needle valves.

In case of a passive pressure control device, it is preferred to calculate an orifice to cause a certain pressure drop. The calculation is based on viscosity of the fluid at that point and the throughput. Anyone skilled in the art can perform this calculation.

Active pressure control devices are typically controlled by a pressure measurement upstream of the device. The pressure is for example measured and compared to the set point. The pressure control device is then adjusted according to the offset recognized.

Alternatively the pressure drop across the device is measured instead of the absolute pressure upstream of the pressure control device. The valve position is adjusted manually, electrically, pneumatically or hydraulically. The control of the valve position, i.e. adjustment to the set point pressure, can for example be made manually or from any automated process control system.

Figure 3:
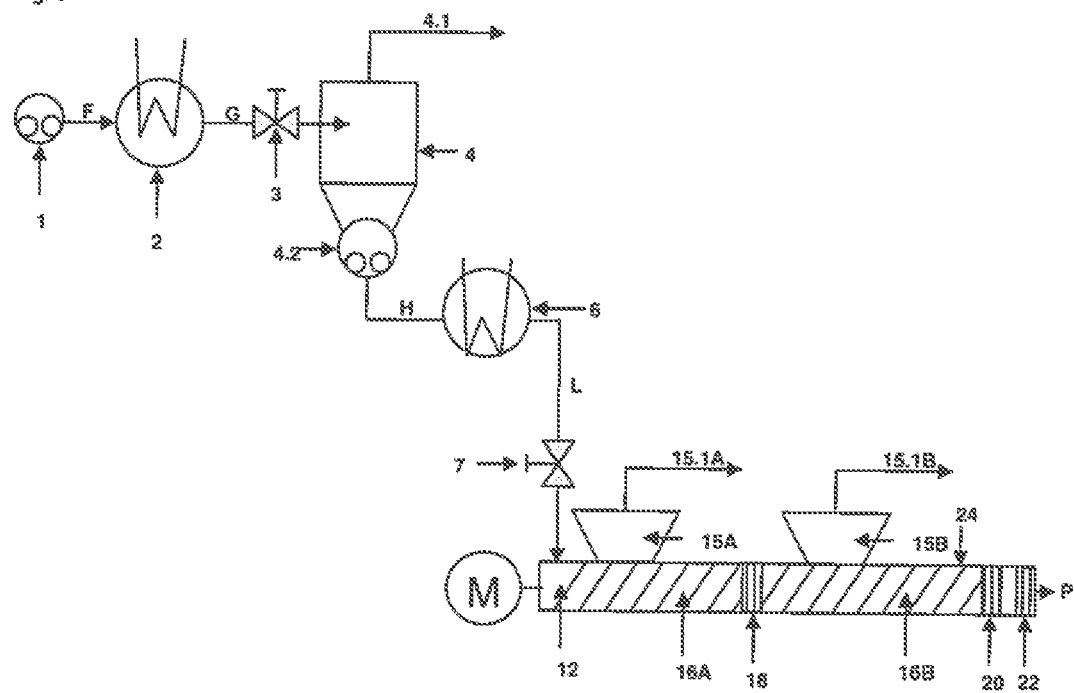
FIG. 3 shows a single-stage concentrator unit having a pressure relief valve, a reheating unit and an extruder unit having a pressure relief valve and further comprising two extruder degassing sections, two accumulating sections, a side feeder and an outlet section.

A Further Embodiment of the Process According to the Invention Having Additional Pressure Control Devices is Shown in FIG. 3.

Apart from the pressure control devices such embodiment is very similar to FIG. 2. The pressure of heated fluid G is controlled by the pressure control device 3, the pressure of reheated, concentrated fluid L entering the extruder is controlled by the pressure control device 7.

In a preferred embodiment of the process according to the invention the reheated concentrated fluid (L) is injected into the first extruder degassing section of the extruder unit, whereby the first extruder degassing section comprises one or more rear vent ports in upstream direction each connected to a vapor line.

The advantage of rear vent ports is that the volatile compounds present in the reheated concentrated fluid L undergo sudden and rapid evaporation, thereby effecting at least partial separation of the synthetic rubber product and the volatile compounds, the vapors emerging through the rear vents in upstream direction. Generally, from about 50 to about 99 wt-%, of the volatile compounds present in the fluid L is removed through the upstream vents.

Figure 5:
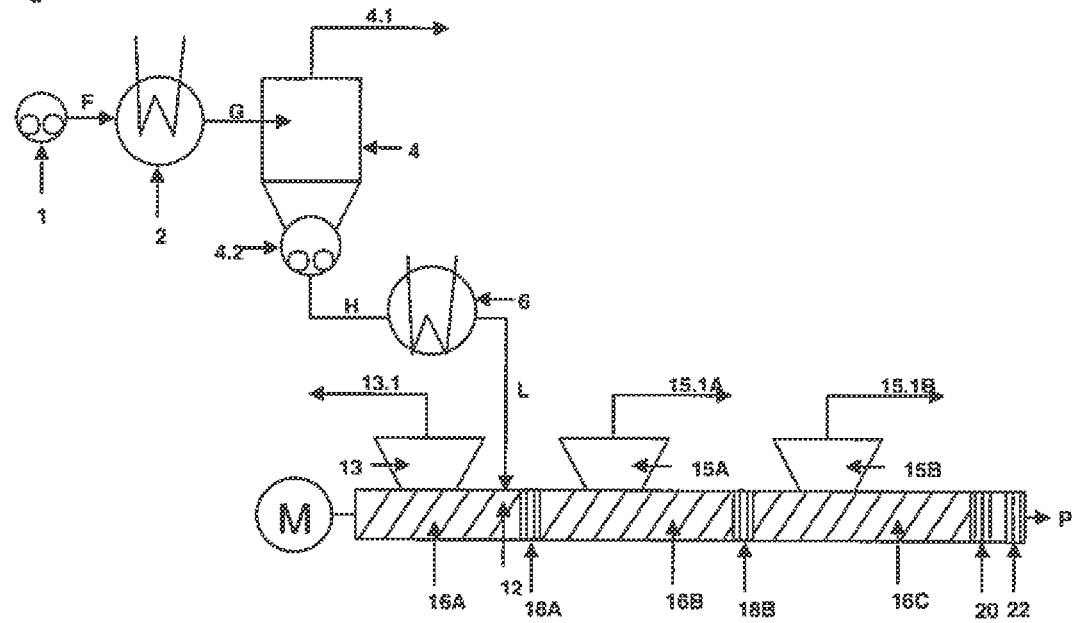
FIG. 5 shows a single-stage concentrator unit, a reheating unit and an extruder unit comprising three extruder degassing sections, three accumulating sections and one outlet section, whereby one extruder degassing section is a backward degassing section.

An Example of this Embodiment is Shown in FIG. 5.

FIG. 5 shows another flow chart and suitable device for the accomplishment of the process according to the invention comprising a single-stage concentrator unit with a pump 1, a concentrator unit comprising heater 2, degassing vessel 4 equipped with a vapour line 4.1 and a pump 4.2, a reheating unit comprising a heater 6 and an extruder unit comprising three extruder degassing sections, whereby the feeding point 12 is located at the first extruder degassing section, comprising a conveying section 16A, a rear vent port 13 connected to a vapor line 13.1 in upstream direction and whereby the extruder unit further comprises two downstream extruder degassing sections each comprising a conveying section 16 B and 16 C, a vent port, 15 A and 15B, whereby the vent ports 15A and 15B are each connected to a vapour line 15.1A and 15.1B, and whereby each of the conveying sections 16A, 16B and 16C is terminated by a accumulating section 18A, 18B and 20 and whereby the extruder unit further comprises an outlet section 22. Generally the streams are processed as described above with the difference being that large amounts of fluid compounds present in the reheated concentrated fluid L are already removed via vent port 13 and the vapour line 13.1 connected thereto.

Figure 6:
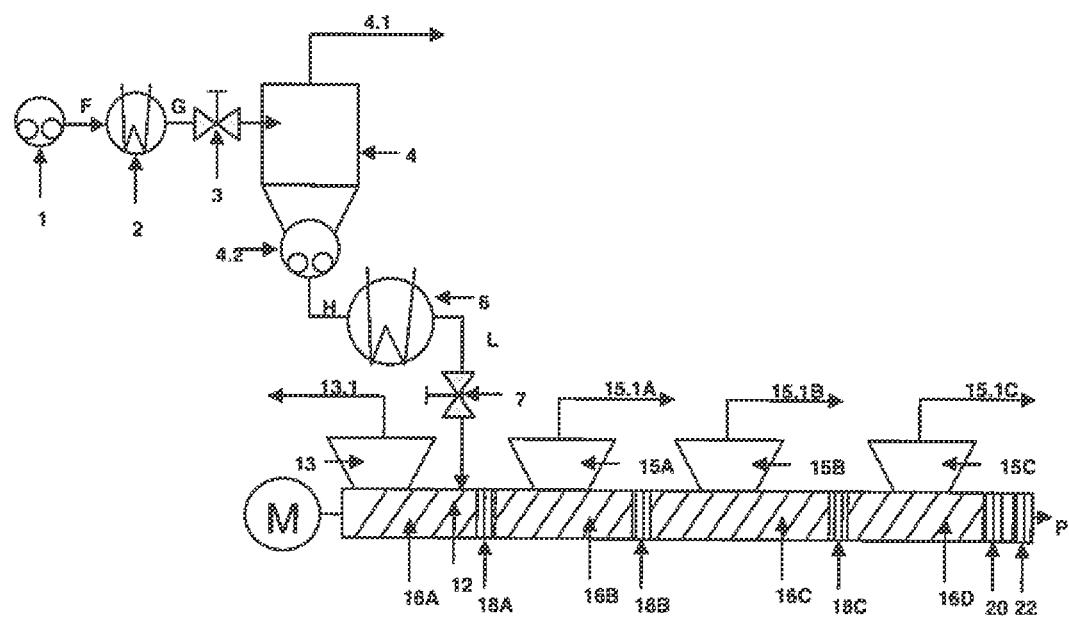
FIG. 6 shows a single-stage concentrator unit comprising a pressure regulation device, a reheating unit and an extruder unit comprising a pressure regulation device, four extruder degassing sections, four accumulating sections and one outlet section, whereby one extruder degassing section is a backward degassing section.

Another Example of this Embodiment is Shown in FIG. 6.

FIG. 6 shows another flow chart and suitable device for the accomplishment of the process according to the invention comprising a single-stage concentrator unit with a pump 1, a concentrator unit comprising a pressure control device 3, a heater 2, a degassing vessel 4 equipped with a vapour line 4.1 and a pump 4.2, a reheating unit comprising a heater 6 and an extruder unit comprising a pressure control device 7 upstream the feeding point 12 of the extruder, four extruder degassing sections, whereby the feeding point 12 is located at the first extruder degassing section, whereby the first extruder degassing section comprises a conveying section 16A, a rear vent port 13 connected to a vapor line 13.1 in upstream direction and whereby the extruder unit further comprises three downstream extruder degassing sections each comprising a conveying section, 16 B, 16 C and 16D, a vent port, 15A, 15B and 15C, whereby the vent ports 15A, 15B and 15C are each connected to a vapour line 15.1A, 15.1B and 15C, and whereby each of the conveying sections 16A, 16B, 16C and 16D is terminated by a accumulating section 18A, 18B, 18C and 20 and whereby the extruder unit further comprises an outlet section 22. Generally, the streams are processed as described above.

Fluid F, which is fed into the heater 2 typically, and as already disclosed above, contains for example from 3 to 50 wt % of a non-volatile nitrile rubber polymer and from 60 to 97 wt % volatile compounds, in particular a solvent, whereby the aforementioned components add up to 90 to 100, preferably 95 to 100 wt % of the total mass of fluid F and in a preferred embodiment from 3 to 40 wt % of a non-volatile nitrile rubber polymer from 60 to 95 wt % volatile organic compounds, in particular a solvent, and from 0.5 to 20 wt % water, whereby the aforementioned components add up to 95 to 100 wt % of the total mass of fluid F.

The process according to this invention is in particular advantageous in view of energy and fresh water consumption. The Products (P) obtained are substantially free of volatile compounds. Such nitrile rubbers being substantially free of volatile compounds show benefits upon processing. On the one hand their use does not result in recognizable mold contamination and the resulting vulcanizates dispose of a well-balanced property profile, in particular very good electrical properties. Additionally the high purity makes said nitrile rubbers viable products for uses in contact with potable water, food or pharmaceutical products. Substantially no leaching of any toxic by-products occurs. In one embodiment of the present invention the Product (P), i.e. the nitrile rubber after being subjected to the process of the present invention contains less than 0.75 wt % preferably less than 0.25 wt % and most preferably less than 0.1 wt % of the organic solvent, preferably monochlorobenzene, dimethylacetamide, or methylethylketone, based on the mass of the nitrile rubber. As compared with the nitrile rubbers obtained by emulsion polymerization, the nitrile rubbers of the invention have the features that they are entirely emulsifier-free and also contain no salts of the kind commonly employed for coagulating the NBR latices after the emulsion polymerization for the purpose of precipitating the nitrile rubber.

The highly pure nitrile rubber obtained by the process of the present invention may be used to prepare vulcanizable mixtures comprising said nitrile rubber and at least one crosslinker. In one preferred embodiment the vulcanizable mixtures further comprise at least one filler.

Optionally it is possible for vulcanizable mixtures of this kind additionally to comprise one or more additives familiar to the skilled person for rubbers. These additives comprise ageing inhibitors, anti-reversion agents, light stabilizers, ozone protectants, processing assistants, plasticizers, mineral oils, tackifiers, blowing agents, dyes, pigments, waxes, resins, extenders, organic acids, vulcanization retarders, metal oxides, and also further filler activators, such as triethanolamine, trimethylolpropane, polyethylene glycol, hexanetriol or aliphatic trialkoxysilanes, for example, or other additives known in the rubber industry (Ullmann's Encyclopedia of Industrial Chemistry, VCH Verlagsgesellschaft mbH, D-69451 Weinheim, 1993, Vol. A 23 "Chemicals and Additives", pp. 366-417).

Suitable crosslinkers include, for example, peroxidic crosslinkers, such as bis(2,4-dichlorobenzoyl) peroxide, dibenzoyl peroxide, bis(4-chlorobenzoyl) peroxide, 1,1-bis (t-butylperoxy)-3,3,5-trimethylcyclohexane, tert-butyl perbenzoate, 2,2 bis(t-butylperoxy)butene, 4,4-di-tert-butyl peroxynonylvalerate, dicumyl peroxide, 2,5-dimethyl-2,5-di (t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)hex-3-yne.

It can be advantageous in addition to these peroxidic crosslinkers to use other additives as well that can be employed to help increase the crosslinking yield: suitable examples of such additives include triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, zinc acrylate, zinc diacrylate, zinc methacrylate, zinc dimethacrylate, 1,2-polybutadiene or N,N'-m-phenylenedimaleimide.

The total amount of the crosslinker or crosslinkers is typically in the range from 1 to 20 phr, preferably in the range from 1.5 to 15 phr and more preferably in the range from 2 to 10 phr, based on the nitrile rubber.

As crosslinkers it is also possible to use sulphur in elemental, soluble or insoluble form, or sulphur donors. Suitable sulphur donors include, for example, dimorpholyl disulphide (DTDM), 2-morpholinodithiobenzothiazole (MBSS), caprolactam disulphide, dipentamethylenethiuram tetrasulphide (DPTT), and tetramethylthiuram disulphide (TMTD).

In the case of the sulphur vulcanization of the nitrile rubber of the invention as well it is also possible to use other additives which can be employed to help increase the crosslinking yield. In principle, however, crosslinking may also take place with sulphur or sulphur donors alone.

Conversely, the crosslinking of the nitrile rubber may also take place only in the presence of the abovementioned additives, i.e. without addition of elemental sulphur or sulphur donors.

Examples of suitable additives which can be employed to help increase the crosslinking yield include dithiocarbamates, thiurams, thiazoles, sulphenamides, xanthogenates, guanidine derivatives, caprolactams and thiourea derivatives.

Dithiocarbamates which can be used include e.g. the following: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldi-thiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate.

Thiurams which can be used include e.g. the following: tetramethylthiuram disulphide (TMTD), tetramethylthiuram monosulphide (TMTM), dimethyldiphenylthiuram disulphide, tetrabenzylthi-uram disulphide, dipentamethylenethiuram tetrasulphide and tetraethylthiuram disulphide (TETD).

Thiazoles which can be used include, for example, the following: 2-mercaptobenzothiazole (MBT), dibenzothiazyl disulphide (MBTS), zinc mercaptobenzothiazole (ZMBT) and copper 2-mercaptobenzothiazole.

Sulphenamide derivates which can be used include, for example, the following: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbamyl-N-oxyethylenesulphenamide.

Xanthogenates which can be used include, for example, the following: sodium dibutylxanthogenate, zinc isopropydibutylxanthogenate and zinc dibutylxanthogenate.

Guanidine derivatives which can be used include, for example, the following: diphenylguanidine (DPG), di-o-tolylguanidine (DOTG) and o-tolylbiguanidine (OTBG).

Dithiophosphates which can be used include, for example, the following: zinc dialkyldithiophosphates (chain length of the alkyl radicals C2 to C16), copper dialkyldithiophosphates (chain length of the alkyl radicals $C_2$ to $C_{16}$) and dithiophosphoryl polysulphide.

As caprolactam it is possible, for example, to use dithiobiscaprolactam.

As thiourea derivatives it is possible, for example, to use N,N'-diphenylthiourea (DPTU), diethylthiourea (DETU) and ethylenethiourea (ETU).

Likewise suitable as additives are, for example, the following: zinc diamine diisocyanate, hexamethylenetetramine, 1,3-bis(citraconimidomethyl)benzene and cyclic disulphanes.

Said additives and also the crosslinking agents can be used either individually or else in mixtures. Preference is given to using the following substances for the crosslinking of the nitrile rubbers: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkyl-dithiophosphate, dimorpholyl disulphide, tellurium diethyldithiocarbamate, nickel dibutyldithio-carbamate, zinc dibutyldithiocarbamate, zinc dimethyldithiocarbamate and dithiobiscaprolactam.

The crosslinking agents and the abovementioned additives may be used in each case in amounts of about 0.05 to 10 phr, preferably 0.1 to 8 phr, more particularly 0.5 to 5 phr (individual metered addition, based in each case on the active substance) relative to the nitrile rubber.

In the case of the inventive sulphur crosslinking it may also be sensible, in addition to the crosslinking agents and abovementioned additives, to use further organic and/or inorganic substances as well, examples being the following: zinc oxide, zinc carbonate, lead oxide, magnesium oxide, calcium oxide, saturated or unsaturated organic fatty acids and their zinc salts, polyalcohols, amino alcohols, e.g. triethanolamine, and also amines, e.g. dibutylamine, dicyclohexylamine, cyclohexylethylamine and polyetheramides.

Where the nitrile rubbers of the invention are rubbers with repeating units of one or more carboxyl-containing termonomers, crosslinking may also take place via the use of a polyamine crosslinker, preferably in the presence of a crosslinking accelerator. There is no restriction on the polyamine crosslinker provided that it is (1) a compound which contains either two or more amino groups (optionally also in salt form) or (2) a species which during the crosslinking reaction, in situ, forms a compound which forms two or more amino groups. Preference is given to using an aliphatic or aromatic hydrocarbon compound in which at least two hydrogen atoms are replaced either by amino groups or else by hydrazide structures (the latter being a structure "C(=O) NHNH$_2$").

Examples of polyamine crosslinkers (ii) of this kind are as follows:
 Aliphatic polyamines, preferably hexamethylenediamine, hexamethylenediamine carbamates, tetraethylenepentamine, hexamethylenediamine-cimmamaldehyde adduct or hexamethylenediamine dibenzoate;
 Aromatic polyamines, preferably 2,2-bis(4-(4-aminophenoxy)phenyl)propane, 4,4'-methylenedianiline, m-phenylenediamine, p-phenylenediamine or 4,4'-methylenebis(o-chloroanilines;
 Compounds having at least two hydrazide structures, preferably isophthalic dihydrazide, adipic dihydrazide or sebacic dihydrazide.

Particularly preferred are hexamethylenediamine and hexamethylenediamine carbamate.

The amount of the polyamine crosslinker in the vulcanizable mixture is typically in the range from 0.2 to 20 parts by weight, preferably in the range from 1 to 15 parts by weight and more preferably in the range from 1.5 to 10 parts by weight, based on 100 parts by weight of the nitrile rubber.

As crosslinking accelerators it is possible to use, in combination with the polyamine crosslinker, any that are known to the skilled person, preferably a basic crosslinking accelerator. Use may be made, for example, of tetramethylguanidine, tetraethylguandine, diphenylguanidine, di-o-tolylguanidine (DOTG), o-tolylbiguanidine and di-o-tolyl-guanidine salt of dicathecolboric acid. Use may also be made of aldehyde-amine crosslinking accelerators such as, for example, n-butylaldehyde-aniline. Particular preference as crosslinking accelerator is given to at least one bicyclic or polycyclic aminic base. These are known to the skilled person. Particular suitability is possessed by 1,8-diazabicyclo[5.4.0]undec-7-ene (DBU), 1,5-diazabicyclo[4.3.0]-5-nonene (DBN), 1,4-diazabicyclo[2.2.2]octane (DABCO), 1,5,7-triazabicyclo[4.4.0]dec-5-ene (TBD), 7-methyl-1,5,7-triazabicyclo[4.4.0]dec-5-ene (MTBD).

The amount of the crosslinking accelerator in this case is typically in a range from 0.5 to parts by weight, preferably 1 to 7.5 parts by weight, more particularly 2 to 5 parts by weight, based on 100 parts by weight of the optionally hydrogenated nitrile rubber.

The vulcanizable mixture based on the optionally hydrogenated nitrile rubber of the invention may in principle also comprise vulcanization onset retarders. These include cyclohexylthiophthalimide (CTP), N,N'-dinitrosopentamethylenetetramine (DNPT), phthalic anhydride (PTA) and diphenylnitrosamine. Cyclohexylthiophthalimide (CTP) is preferred.

Aside from the addition of the crosslinker or crosslinkers, the nitrile rubber of the invention may also be mixed with further customary rubber additives.

Fillers which can be used include, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form), or silicates.

Suitable filler activators include, in particular, organic silanes, such as, for example, vinyltrimethyloxysilane, vinyldimethoxymethylsilane, vinyltriethoxysilane, vinyltris (2-methoxy-ethoxy)silane, N-cycohexyl-3-aminopropylt-rimethoxysilane, 3-aminopropyltrimethoxysilane, methylt-rimethoxysilane, methyltriethoxysilane, dimethyldimethoxysilane, dimethyldiethoxysilane, trimethyletethoxysilane, isooctyltrimethoxysilane, isooctyltri-ethoxysilane, hexadecyltrimethoxysilane or (octadecyl)m-ethyldimethoxysilane. Further filler activators are, for example, surface-active substances such as triethanolamine and ethylene glycols having molecular weights of 74 to 10 000 g/mol. The amount of filler activators is typically 0 to 10 phr, based on 100 phr of the nitrile rubber.

As ageing inhibitors it is possible to add to the vulcanizable mixtures those which have already been described in this specification in connection with the coagulation of the latex. These inhibitors are used typically in amounts of about 0 to 5 phr, preferably 0.5 to 3 phr, per 100 phr of the nitrite rubber.

As mould release agents saturated or partly unsaturated fatty acids and oleic acids and their derivatives (fatty acid esters, fatty acid salts, fatty alcohols, fatty acid amides) may be used, which are preferably used as a constituent of the mixture, and also to products which can be applied to the mould surface, such as, for example, products based on low molecular mass silicone compounds, products based on fluoropolymers, and products based on phenolic resins.

As a constituent of the mixture the mould release agents are used in amounts of about 0 to 10 phr, preferably 0.5 to 5 phr, based on 100 phr of the nitrile rubber.

Also possible is reinforcement with strengthening agents (fibres) of glass in accordance with the teaching of U.S. Pat. No. 4,826,721, as is reinforcement by cords, woven fabrics, fibres of aliphatic and aromatic polyamides (Nylon®, Aramid®), polyesters and natural fibre products.

It is also possible to prepare vulcanizates from such vulcanizable mixtures which is characterized in that the above-described vulcanizable mixture is subjected to crosslinking. Crosslinking is brought about typically either by at least one crosslinker or else by photochemical activation.

In the case of the photochemically activated vulcanization it is possible as UV activators to use the activators known typically to the skilled person, examples being benzophenone, 2-methylbenzophenone, 3,4-dimethylbenzophenone, 3-methylbenzophenone, 4,4'-bis(diethyl-amino)benzophenone, 4,4'-dihydroxybenzophenone, 4,4'-bis[2-(1-propenyl) phenoxy]-benzophenone, 4-(diethylamino)benzophenone, 4-(dimethylamino)benzophenone, 4-benzoylbiphenyl, 4-hydroxybenzophenone, 4-methylbenzophenone, benzophenone-3,3',4,4'-tetracarboxylic dianhydride, 4,4'-bis(dimethylamino)benzophenone, acetophenone, 1-hydroxycyclohexyl phenyl ketone, 2,2-diethoxyacetophenone, 2,2-dimethoxy-2-phenylacetophenone, 2-benzyl-2-(dimethylamino)-4'-morpholinobutyrophenone, 2-hydroxy-2-methylpropiophenone, 2-hydroxy-4'-(2-hydroxyethoxy)-2-methylpropiophenone, 3'-hydroxyacetophenone, 4'-ethoxyacetophenone, 4'-hydroxyacetophenone, 4'-phenoxyacetophenone, 4'-tert-butyl-2',6'-dimethylacetophenone, 2-methyl-4'-(methylthio)-2-morpholinopropiophenone, diphenyl(2,4,6-trimethylbenzoyl)phosphine oxide, phenylbis(2,4,6-trimethylbenzoyl)phosphine oxide, methyl benzoylformate, benzoin, 4,4'-dimethoxybenzoin, benzoin methyl ether, benzoin ethyl ether, benzoin isopropyl ether, benzoin isobutyl ether, 4,4'-dimethylbenzyl, hexachlorocyclopentadienes or combinations thereof.

The vulcanization takes place typically as part of a shaping process, preferably with employment of an injection moulding process. The mouldings obtainable through this vulcanization process cover a broad spectrum, e.g. seals, caps, hoses or membranes. It is possible, for example, to produce O-ring seals, flat seals, corrugated gaskets, sealing sleeves, sealing caps, dust protection caps, plug seals, thermal insulation hoses (with and without addition of PVC) oil cooler hoses, air intake hoses, servocontrol hoses or pump diaphragms.

The reference numerals used hereinbefore with regard to the equipment and are summarized below:
1 pump
2, 2A, 2B heater
3 pressure control device
4, 4A, 4B degassing vessel
4.1, 4.1A, 4.1B vapor line
4.2, 4.2A, 4.2B pump
6 reheating unit
7 pressure control device
12 feeding point
13 rear vent port (upstream)
13.1 vapor line
15, 15A, 15B, 15B, 15C vent port (downstream)
15.1, 15.1A, 15.1B, 15.1C vapor line
16, 16A, 16B, 16B, 16C conveying section (downstream)
18, 18A, 18B, 18B, 18C accumulating section
20 last accumulating section
22 outlet section
F fluid F
G heated fluid H
H concentrated fluid H J pre-concentrated fluid J
K reheated pre-concentrated fluid K
L reheated concentrated fluid L
P nitrile rubber polymer obtained by the process according to the invention.

What is claimed is:

1. A nitrile rubber comprising:
   (i) repeating units derived from:
      at least one conjugated diene, and
      at least one α,β-unsaturated nitrile, and
   (ii) one or more structural element of the general formulae (I), (II), (III), (IV) or (V)

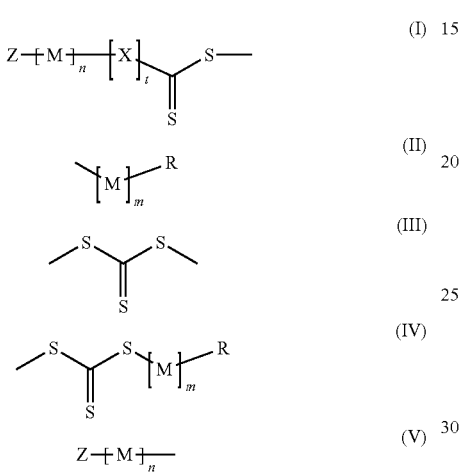

wherein:
   Z represents H, branched or unbranched, saturated or one or more times unsaturated alkyl, saturated or one or more times unsaturated carbo- or heterocyclic residue, aryl, heteroaryl, heteroarylalkyl, alkoxy, aryloxy, heteroaryloxy, amino, amido, hydroxyimino, carbamoyl, akoxycarbonyl, F, Cl, Br, I, hydroxy, phosphonato, phosphinato, alkylthio, arylthio, sulfanyl, sulfinyl, sulfono, sulfino, sulfeno, sulfonyl, sulfamoyl, silyl, silyloxy, nitril, carbonyl, carboxy, oxycarbonyl, oxysulfonyl, oxo, thioxo, borate, selenate, epoxy, cyanate, thiocyanate, isocyanate, thioisocyanate or isocyanide,
   M represents repeating units derived from one or more monomers which are one or more times unsaturated, including conjugated or unconjugated dienes, alkynes and vinyl compounds, or a structural element derived from polymers comprising polyether, and polyalkylenoxides, polysiloxanes, polyols, polycarbonates, polyurethanes, polyisocyanates, polysaccharides, polyester or polyamides,
   n and m are the same or different and are 0 to 10,000,
   t is 0 or 1, if n=0, and equals 1, if n≠0,
   X represents C($Z_2$), N(Z), P(Z), P(=O)(Z), O, S, S(=O) or S(=O)$_2$ wherein Z has the same meaning as defined hereinabove,
   R (a) in case that m≠0 has the same meaning as the residue Z, and
      (b) in case that m=0, represents H, a branched or unbranched, saturated, one or more times unsaturated alkyl, a saturated, one or more times unsaturated carbo- or heterocyclic residue, aryl, heteroaryl, heteroarylalkyl, alkoxy, aryloxy, heteroaryloxy, amino, amido, carbamoyl, alkoxy, aryloxy, alkylthio, arylthio, sulfanyl, sulfinyl, sulfono, sulfino, sulfeno, sulfonyl, sulfamoyl, carbonyl, carboxy, oxycarbonyl, oxysulfonyl, oxo, thioxo, epoxy, cyanate, thiocyanate, isocyanate, thiosocyanate or isocyanide, and
   the nitrile rubber has a combined content of water and volatile organic compounds of less than 1.25 wt %, wherein the content of water is less than 0.5 wt %, and the content of volatile organic compounds is less than 0.75 wt %, based on the mass of the nitrile rubber,
   wherein the general structural elements (ii) comprise:
   (a)

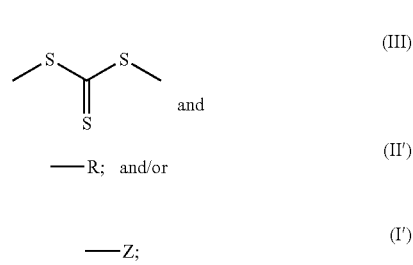

(b)
   —Z;  (I')

where
   Z has the same meaning as in the general formula (I), and
   R has the same meaning as in the general formula (II) for m=0, and
   R and Z are alike or different, albeit in each case with the proviso that R and Z following homolytic fission of their bond to the respectively adjacent atom in the nitrile rubber each form a secondary, tertiary or aromatically stabilized radical.

2. The nitrile rubber pursuant to claim 1, wherein the combined content of water and volatile organic compounds in the nitrile rubber is less than 0.75 wt %, wherein the content of water is less than 0.25 wt %, and the content of volatile organic compounds is less than 0.50 wt %, based on the mass of the nitrile rubber.

3. The nitrile rubber pursuant to claim 1, wherein the combined content of water and volatile organic compounds in the nitrile rubber is less than 0.5 wt %, wherein the content of water is less than 0.1 wt %, and the content of volatile organic compounds is less than 0.4 wt %, based on the mass of the nitrile rubber.

4. The nitrile rubber pursuant to claim 1, wherein the combined content of water and volatile organic compounds in the nitrile rubber is less than 0.2 wt %, wherein the content of water is less than 0.075 wt %, and the content of volatile organic compounds is less than 0.125 wt %, based on the mass of the nitrile rubber.

5. The nitrile rubber pursuant to claim 1, wherein the repeating units are derived from at least one conjugated diene, at least one α,β-unsaturated nitrile, and one or more copolymerizable monomers.

6. The nitrile rubber pursuant to claim 1, wherein:
   the at least one conjugated diene comprises $C_4$-$C_6$ conjugated diene; and
   the at least one α,β-unsaturated nitrile comprises $C_3$-$C_5$ α,β-unsaturated nitrile.

7. The nitrile rubber pursuant to claim 1, wherein:
   the at least one conjugated diene comprises 1,2-butadiene, 1,3-butadiene, isoprene, 2,3-dimethylbutadiene, piperylene or mixtures thereof; and the at least one α,β-unsaturated nitrile comprises acrylonitrile, methacrylonitrile, ethacrylonitrile or mixtures thereof.

8. The nitrile rubber pursuant to claim 7, wherein the repeating units further comprise one or more copolymerizable monomers selected from the group consisting of aromatic vinylmonomers, fluorine-containing vinyl monomers, copolymerizable anti-ageing monomers, non-conjugated dienes and alkynes, and copolymerizable monomers containing carboxyl groups.

9. The nitrile rubber pursuant to claim 8, wherein the copolymerizable monomers are selected from the group consisting of styrene, α-methylstyrene, vinylpyridine, fluoroethyl vinyl ether, fluoropropyl vinyl ether, o-fluoromethylstyrene, vinyl pentafluorobenzoate, difluoroethylene, tetrafluoroethylene, N-(4-anilinophenyl)acrylamide, N-(4-anilinophenyl)methacrylamide, N-(4-anilinophenyl)cinnamides, N-(4-anilinophenyl)crotonamide, N-phenyl-4-(3-vinylbenzyloxy)aniline, N-phenyl-4-(4-vinylbenzyloxy)aniline, 4-cyanocyclohexene, 4-vinylcyclohexene, 1-butyne, 2-butyne, and copolymerizable monomers containing α,β-unsaturated monocarboxylic acids, their esters, α,β-unsaturated dicarboxylic acids, their monoesters or diesters, or their corresponding anhydrides or amides.

* * * * *